US012659835B2

(12) United States Patent
Li et al.

(10) Patent No.: US 12,659,835 B2
(45) Date of Patent: Jun. 16, 2026

(54) POWER-SAVING COMMUNICATION METHOD AND APPARATUS FOR ACCESSING CELLULAR NETWORKS

(71) Applicant: HUAWEI TECHNOLOGIES CO., LTD., Shenzhen (CN)

(72) Inventors: Bingzhao Li, Beijing (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 523 days.

(21) Appl. No.: 18/172,145

(22) Filed: Feb. 21, 2023

(65) Prior Publication Data

US 2023/0199619 A1 Jun. 22, 2023

Related U.S. Application Data

(63) Continuation of application No. PCT/CN2021/114158, filed on Aug. 23, 2021.

(30) Foreign Application Priority Data

Aug. 21, 2020 (CN) .......................... 202010852143.0
Sep. 29, 2020 (CN) .......................... 202011052905.5

(51) Int. Cl.
 *H04W 48/02* (2009.01)
 *H04W 36/08* (2009.01)
 *H04W 68/00* (2009.01)

(52) U.S. Cl.
 CPC ........... *H04W 48/02* (2013.01); *H04W 36/08* (2013.01); *H04W 68/005* (2013.01)

(58) Field of Classification Search
 CPC ... H04W 48/02; H04W 36/08; H04W 68/005; H04W 52/0216; H04W 52/0219;

(Continued)

(56) References Cited

U.S. PATENT DOCUMENTS

2008/0268878 A1* 10/2008 Wang .................... H04W 68/00
                                                          455/458
2014/0241180 A1* 8/2014 Amerga .............. H04W 36/302
                                                          370/252

(Continued)

FOREIGN PATENT DOCUMENTS

CN        110022594 A      7/2019
CN        110149668 A      8/2019

(Continued)

OTHER PUBLICATIONS

"3rd Generation Partnership Project; Technical Specification Group Radio Access Network; Improvement of the Multimedia Broadcast Multicast Service (MBMS) in UTRAN (Release 7)," 3GPP TR 25.905 V2.0.0, R2-063643, pp. 1-40, 3rd Generation Partnership Project, Valbonne, France (Dec. 2006).

(Continued)

*Primary Examiner* — Michael Y Mapa
(74) *Attorney, Agent, or Firm* — Leydig, Voit & Mayer, Ltd.

(57) ABSTRACT

A communication method and apparatus is provided. The method includes: camping on a first cell by a terminal device. The method further includes: determining, by the terminal device, to access a second cell in response to: receiving a paging message from the first cell, determining that there is to-be-transmitted uplink information, or determining that there is a to-be-transmitted non-multicast service. A frequency of the first cell is different from a frequency of the second cell. The terminal device may not perform uplink transmission or may receive only a multicast service in the first cell so that energy consumption of cell measurement and beam selection is reduced. In addition, resource utilization of a communication system can be improved through flexible deployment.

20 Claims, 9 Drawing Sheets

(58) Field of Classification Search
CPC ......... H04W 52/0254; H04W 52/0258; H04W
52/028; H04W 48/20; H04W 48/08;
H04W 48/16; H04W 52/0212; H04W
52/0225; H04W 52/0261; Y02D 30/70
USPC ...... 370/328, 331–332; 455/426.1, 436–444,
455/458, 515
See application file for complete search history.

(56) References Cited

U.S. PATENT DOCUMENTS

| | | | |
|---|---|---|---|
| 2016/0044552 A1 | 2/2016 | Heo et al. | |
| 2017/0339606 A1* | 11/2017 | Kim ..................... | H04W 36/22 |

FOREIGN PATENT DOCUMENTS

| | | | | |
|---|---|---|---|---|
| CN | 111615856 A | 9/2020 | | |
| WO | 2016033779 A1 | 3/2016 | | |
| WO | WO-2019141101 A1 * | 7/2019 | ............ | H04W 72/23 |

OTHER PUBLICATIONS

OPPO, "Higher priority frequency searching relaxes for UE power saving," 3GPP TSG-RAN2#106, Reno, USA, R2-1905594, Total 3 pages, 3rd Generation Partnership Project, Valbonne, France (Apr. 13-17, 2019).

Huawei (moderator), "Summary of moderated email discussion on Rel-17 NR Multicast Broadcast," 3GPP TSG-RAN #85, Newport Beach, USA, RP-191859, Total 31 pages, 3rd Generation Partnership Project, Valbonne, France (Sep. 16-20, 2019).

ZTE et al., "Cell selection/ reselection for NR V2X," 3GPP TSG-RAN WG2 Meeting #109 electronic, R2-2000267, Total 18 pages, 3rd Generation Partnership Project, Valbonne, France (Feb. 24-Mar. 6, 2020).

* cited by examiner

Network
device 1

Network
device 2

Terminal
device

Network device 2

Network
device 1

Terminal device

| S401: Camp on a first cell |
|---|

| S402: Determine to access a second cell in response to receiving a paging message from the first cell, in response to determining that there is to-be-transmitted uplink information, or in response to determining that there is a to-be-transmitted non-multicast service |
|---|

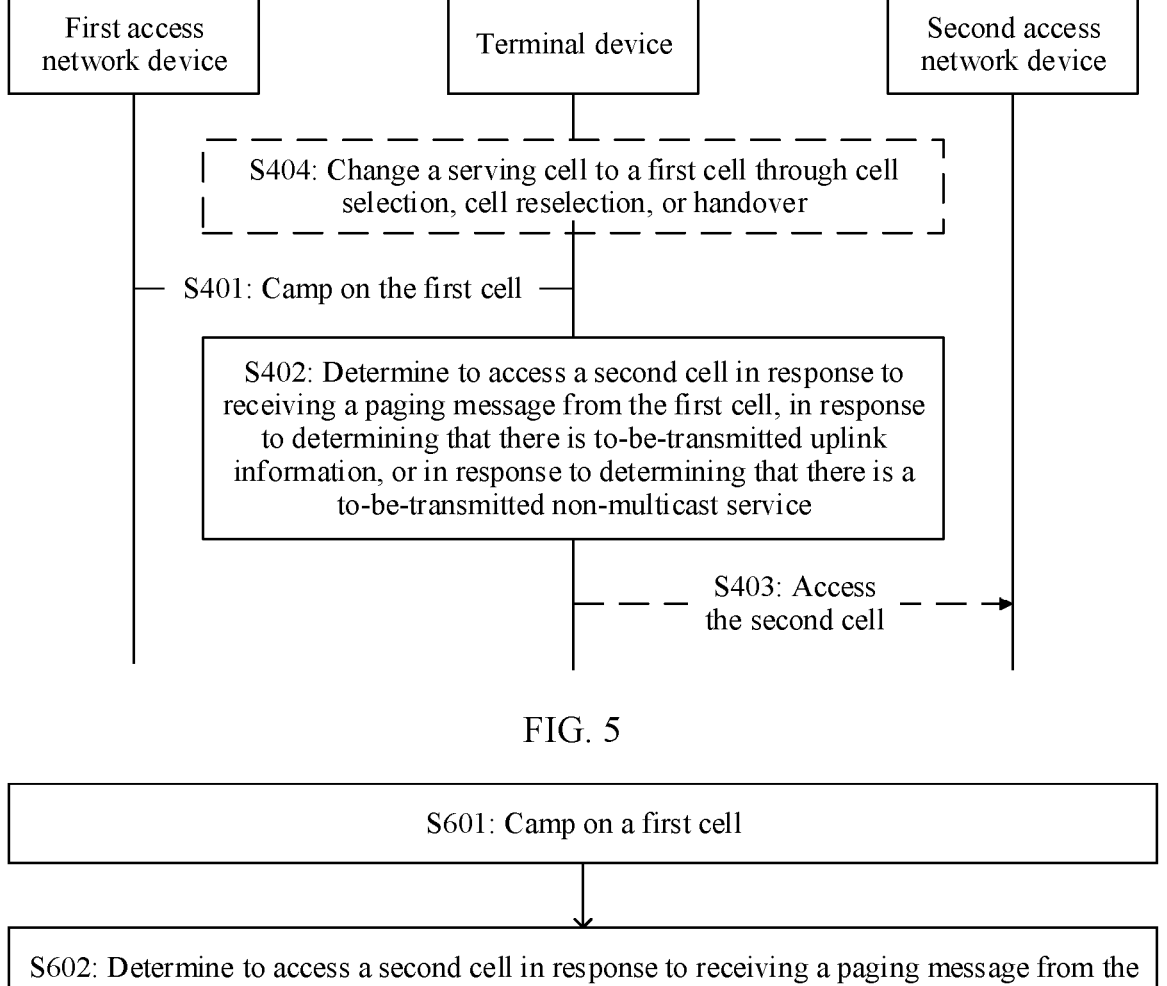

First access
network device

Terminal device

Second access
network device

S404: Change a serving cell to a first cell through cell
selection, cell reselection, or handover S401: Camp on the first cell S402: Determine to access a second cell in response to
receiving a paging message from the first cell, in response
to determining that there is to-be-transmitted uplink
information, or in response to determining that there is a
to-be-transmitted non-multicast service S403: Access
the second cell

FIG. 5

S601: Camp on a first cell

S602: Determine to access a second cell in response to receiving a paging message from the
first cell or in response to determining that there is a to-be-transmitted non-multicast service

FIG. 6

S1401: Camp on a first frequency

S1402: Receive, at the first frequency, access information corresponding to a second frequency S1403: Access the second frequency based on the access information

1

POWER-SAVING COMMUNICATION METHOD AND APPARATUS FOR ACCESSING CELLULAR NETWORKS

CROSS-REFERENCE TO RELATED APPLICATIONS

This application is a continuation of International Application No. PCT/CN2021/114158, filed on Aug. 23, 2021, which claims priority to Chinese Patent Application No. 202010852143.0, filed on Aug. 21, 2020 and Chinese Patent Application No. 202011052905.5, filed on Sep. 29, 2020. All of the aforementioned patent applications are hereby incorporated by reference in their entireties.

TECHNICAL FIELD

This application relates to the field of communication technologies, and in particular, to a communication method and apparatus.

BACKGROUND

In a new radio (NR) system, services are increasingly diverse, including an enhanced mobile broadband (eMBB) service, an ultra-reliable low-latency communication (URLLC) service, and a massive machine-type communications (mMTC) service. Diversified service requirements also impose higher requirements on terminal devices. For example, compared with the eMBB service, the mMTC service has a higher requirement on power consumption of a terminal device. For another example, some deployment environments of machine-type terminal devices are inconvenient for adjusting a power supply system. In this case, the machine-type terminal devices are required to have low power consumption, to prolong use time and adapt to a service requirement.

Mobility management is an important part of wireless mobile communication. The mobility management is a general term of related operations involved to ensure that a communication link between a network and a terminal device is not interrupted due to movement of the terminal device. Based on a state of the terminal device, the mobility management may be roughly classified into two parts: radio resource control (RRC) idle state (RRC_idle state) mobility management and RRC connected state (RRC_connected state) mobility management. Mobility management in the RRC idle state mainly refers to a cell selection/reselection process. Mobility management in the RRC connected state mainly refers to a cell handover process. Both the cell selection/reselection and the cell handover are performed based on a radio resource management (RRM) measurement result of the terminal device. Therefore, RRM measurement is a basis of the mobility management.

The RRM measurement includes measurement of a serving cell of the terminal device, and further includes measurement of an adjacent cell (also referred to as a neighboring cell for short) of the serving cell, for example, measurement of a neighboring cell that belongs to a communication system that is the same as that of the serving cell, or measurement of a neighboring cell that belongs to a system that is different from that of the serving cell. A process of measuring the serving cell by the terminal device is always performed, and measurement of the neighboring cell is started only when a specific condition is met. To reduce power consumption of the terminal device caused by measurement, a neighboring cell measurement relaxation condition is further set for neighboring cell measurement. When the neighboring cell measurement relaxation condition is met, the terminal device may not perform the neighboring cell measurement. However, neighboring cell relaxation measurement is applicable only to a terminal device in a static state or a terminal device that moves at a low speed. If a terminal device moves, neighboring cell measurement still needs to be performed.

Therefore, how to further reduce energy consumption of the terminal device becomes an urgent problem to be resolved.

SUMMARY

Embodiments of this application provide a communication method and apparatus, to reduce energy consumption of a terminal device.

According to a first aspect, a first communication method is provided. The method includes: camping on a first cell; and determining to access a second cell in response to receiving a paging message from the first cell, in response to determining that there is to-be-transmitted uplink information, or in response to determining that there is a to-be-transmitted non-multicast service. A frequency of the first cell is a first frequency, and a frequency of the second cell is a second frequency.

The method may be performed by a first communication apparatus. The first communication apparatus may be a communication device or a communication apparatus, for example, a chip, that can support the communication device in implementing a function required in the method. For example, the first communication apparatus is a terminal device, a chip that is disposed in a network device and that is configured to implement a function of the terminal device, or another component configured to implement the function of the terminal device. In the following description process, an example in which the first communication apparatus is a terminal device is used.

According to the solution in this embodiment of this application, the terminal device camps on the first cell to receive a downlink transmission, and accesses the second cell when receiving a paging message, when needing to transmit uplink information, or when needing to transmit a non-multicast service. In this way, RRM measurement overheads and system information receiving overheads are reduced in the first cell, and power is saved. In addition, the terminal device obtains a service in the first cell, to ensure service transmission.

With reference to the first aspect, in some implementations of the first aspect, the first cell and the second cell meet at least one of the following:

the first frequency is lower than the second frequency;

coverage of the first cell is greater than coverage of the second cell; and a quantity of beams of the first cell is less than a quantity of beams of the second cell.

According to the solution in this embodiment of this application, the first cell may be deployed by using a low frequency beam, to implement wide coverage by using a small quantity of beams. In this way, when the terminal device camps on the first cell, beam measurement overheads can be reduced, and energy consumption of the terminal device can be reduced.

With reference to the first aspect, in some implementations of the first aspect, the first cell does not support uplink transmission, or the first cell supports only multicast service transmission.

According to the solution in this embodiment of this application, the terminal device may receive only a downlink transmission or only a non-multicast service in the first cell without accessing the first cell, to reduce RRM measurement overheads. A communication system may implement wide-coverage downlink transmission or multicast transmission by using one access network device, to improve communication efficiency, and reduce network deployment overheads.

With reference to the first aspect, in some implementations of the first aspect, the determining to access a second cell in response to receiving a paging message from the first cell, in response to determining that there is to-be-transmitted uplink information, or in response to determining that there is a to-be-transmitted non-multicast service includes: determining to access the second cell in response to determining that there is to-be-transmitted uplink information and determining that the first cell does not support uplink transmission; or determining to access the second cell in response to determining that there is to-be-transmitted uplink information and determining that the to-be-transmitted uplink information is a data service; or determining to access the second cell in response to determining that there is a to-be-transmitted non-multicast service and determining that the first cell supports only multicast service transmission.

According to the solution in this embodiment of this application, a network device may indicate, by using indication information, the terminal device whether to access the first cell. The indication information may be carried in a paging message. When the first cell does not support downlink transmission, the terminal device determines to access the second cell when the terminal device needs to perform uplink transmission. When the first cell does not support non-multicast service transmission, the terminal device determines to access the second cell when the terminal device needs to transmit a non-multicast service. In this way, the terminal device may determine, based on network load and a service requirement, whether to access the first cell, to ensure normal running of the service.

With reference to the first aspect, in some implementations of the first aspect, a reference signal of the first cell is measured, and when a measurement result is less than a first threshold, the terminal device determines to access the second cell.

According to the solution in this embodiment of this application, when access is required, the terminal device may determine, based on quality of the reference signal of the first cell, whether to access the first cell. When the terminal device is close to a first access network device, the terminal device may access the first cell, where the first access network device is an access network device corresponding to the first cell.

With reference to the first aspect, in some implementations of the first aspect, the terminal device receives indication information from the network device, where the indication information indicates to access the second cell, indicates not to access the first cell, indicates to select a cell based on the second frequency for access, or indicates that a frequency priority of the first frequency is the lowest priority.

According to the solution in this embodiment of this application, the network device may indicate, by using the indication information, the terminal device whether to access the first cell, or may specify, by using the indication information, a cell or a frequency to be accessed by the terminal device, so that dynamic control is implemented based on the network load, and resource utilization of the communication system is improved.

With reference to the first aspect, in some implementations of the first aspect, the terminal device performs cell selection based on the second frequency, and chooses to access the second cell. Alternatively, the terminal device lowers the frequency priority of the first frequency to a frequency priority lower than that of the second frequency, triggers measurement on a cell whose frequency is the second frequency, and reselects the second cell.

According to the solution in this embodiment of this application, the terminal device may adjust a priority of a cell based on a frequency priority, or the terminal device may determine a to-be-accessed cell through cell selection or cell reselection.

With reference to the first aspect, in some implementations of the first aspect, a serving cell of the terminal device is a third cell, and a frequency of the third cell is different from the first frequency. The terminal device changes the serving cell to the first cell through cell selection, cell reselection, or handover.

According to the solution in this embodiment of this application, when the terminal device determines that access is not required, the terminal device may change the serving cell to the first cell through cell selection, cell reselection, or handover, to save power.

With reference to the first aspect, in some implementations of the first aspect, the terminal device receives a first message from the network device, where the first message indicates the frequency priority of the first frequency, or the first message indicates that the first frequency is a frequency in an energy-saving mode. The terminal device measures the first frequency, and changes the serving cell to the first cell.

According to the solution in this embodiment of this application, the network device may indicate a priority of the first cell to the terminal device by using the first message, so that the terminal device changes the serving cell to the first cell in a timely manner. In this way, measurement overheads of the terminal device can be reduced, and load of the communication system can be balanced.

With reference to the first aspect, in some implementations of the first aspect, the first message is a broadcast message or a dedicated radio resource control RRC message.

According to the solution in this embodiment of this application, the network device may simultaneously indicate, to a plurality of terminal devices by using the broadcast message, the priority of the first cell or that the first frequency is a frequency in the energy-saving mode, to save signaling. Alternatively, the network device may indicate, for a single terminal device, the priority of the first cell or that the first frequency is a frequency in the energy-saving mode, to implement flexible scheduling.

With reference to the first aspect, in some implementations of the first aspect, the terminal device determines, based on at least one of an energy-saving mode of the terminal device, a service activity degree of the terminal device, power of the terminal device, and an access delay of the terminal device, to change the serving cell to the first cell.

According to the solution in this embodiment of this application, the terminal device may determine, based on an energy-saving requirement and the service requirement of the terminal device, whether to enter the first cell to implement power saving.

According to a second aspect, a second communication method is provided. The method includes: determining indication information, where the indication information indicates to access a second cell, indicates not to access a first cell, indicates to select a cell based on a second frequency for access, or indicates that a frequency priority of a first frequency is the lowest priority; and sending the indication information to a terminal device through the first cell. A frequency of the first cell is the first frequency, a frequency of the second cell is the second frequency, the first cell is a cell of a first access network device, and the second cell is a cell of a second access network device.

The method may be performed by a second communication apparatus. The second communication apparatus may be a communication device or a communication apparatus, for example, a chip, that can support the communication device in implementing a function required in the method. For example, the second communication apparatus is a network device, for example, an access network device, a chip that is disposed in the network device and that is configured to implement a function of the network device, or another component configured to implement the function of the network device. In the following description process, an example in which the second communication apparatus is a network device is used.

With reference to the second aspect, in some implementations of the second aspect, the first cell and the second cell meet at least one of the following:

the first frequency is lower than the second frequency;

coverage of the first cell is greater than coverage of the second cell; and a quantity of beams of the first cell is less than a quantity of beams of the second cell.

According to the solution in this embodiment of this application, the first cell may be deployed by using a low frequency beam, to implement wide coverage by using a small quantity of beams. In this way, when the terminal device camps on the first cell, beam measurement overheads can be reduced, and energy consumption of the terminal device can be reduced.

With reference to the second aspect, in some implementations of the second aspect, the first cell does not support uplink transmission, or the first cell supports only multicast service transmission.

According to the solution in this embodiment of this application, the terminal device may receive only a downlink transmission or only a non-multicast service in the first cell without accessing the first cell, to reduce RRM measurement overheads. A communication system may implement wide-coverage downlink transmission or multicast transmission by using one access network device, to improve communication efficiency, and reduce network deployment overheads.

With reference to the second aspect, in some implementations of the second aspect, the indication information is carried in a paging message.

With reference to the second aspect, in some implementations of the second aspect, a first message is sent to the terminal device, where the first message indicates the frequency priority of the first frequency, or the first message indicates that the first frequency is a frequency in an energy-saving mode.

According to the solution in this embodiment of this application, the network device may indicate a priority of the first cell to the terminal device by using the first message, so that the terminal device changes a serving cell to the first cell in a timely manner. In this way, measurement overheads of the terminal device can be reduced, and load of the communication system can be balanced.

With reference to the second aspect, in some implementations of the second aspect, the first message is a broadcast message or a dedicated radio resource control RRC message.

According to the solution in this embodiment of this application, the network device may simultaneously indicate, to a plurality of terminal devices by using the broadcast message, the priority of the first cell or that the first frequency is a frequency in the energy-saving mode, to save signaling. Alternatively, the network device may indicate, for a single terminal device, the priority of the first cell or that the first frequency is a frequency in the energy-saving mode, to implement flexible scheduling.

According to a third aspect, a third communication method is provided. The method includes: camping on a first cell, and determining to access a second cell in response to determining that there is a to-be-transmitted non-multicast service. A frequency of the first cell is a first frequency, and a frequency of the second cell is a second frequency.

The method may be performed by a third communication apparatus. The third communication apparatus may be a communication device or a communication apparatus, for example, a chip, that can support the communication device in implementing a function required in the method. For example, the third communication apparatus is a terminal device, a chip that is disposed in the terminal device and that is configured to implement a function of the terminal device, or another component configured to implement the function of the terminal device. In the following description process, an example in which the third communication apparatus is a terminal device is used.

According to the solution in this embodiment of this application, the terminal device may receive only a multicast service in the first cell, and determine to access the second cell when needing to transmit a non-multicast service, to save power in the first cell and obtain another service from the second cell.

With reference to the third aspect, in some implementations of the third aspect, the first cell and the second cell meet at least one of the following:

the first frequency is lower than the second frequency;

coverage of the first cell is greater than coverage of the second cell; and a quantity of beams of the first cell is less than a quantity of beams of the second cell.

According to the solution in this embodiment of this application, the first cell may be deployed by using a low frequency beam, to implement wide coverage by using a small quantity of beams. In this way, when the terminal device camps on the first cell, beam measurement overheads can be reduced, and energy consumption of the terminal device can be reduced.

With reference to the third aspect, in some implementations of the third aspect, the first cell supports only multicast service transmission.

According to the solution in this embodiment of this application, the terminal device may receive only a non-multicast service in the first cell without accessing the first cell, to reduce RRM measurement overheads. A communication system may implement wide-coverage multicast transmission by using one access network device, to improve communication efficiency, and reduce network deployment overheads.

With reference to the third aspect, in some implementations of the third aspect, the determining to access a second cell in response to determining that there is a to-be-transmitted non-multicast service includes: determining to access the second cell in response to determining that there is a to-be-transmitted non-multicast service and determining that the first cell supports only multicast service transmission.

With reference to the third aspect, in some implementations of the third aspect, a reference signal of the first cell is measured, and when a measurement result is less than a first threshold, the terminal device determines to access the second cell.

According to the solution in this embodiment of this application, when access is required, the terminal device may determine, based on quality of the reference signal of the first cell, whether to access the first cell. When the terminal device is close to a first access network device, the terminal device may access the first cell, where the first access network device is an access network device corresponding to the first cell.

With reference to the third aspect, in some implementations of the third aspect, the terminal device receives indication information from a network device, where the indication information indicates to access the second cell, indicates not to access the first cell, indicates to select a cell based on the second frequency for access, or indicates that a frequency priority of the first frequency is the lowest priority.

According to the solution in this embodiment of this application, the network device may indicate, by using the indication information, the terminal device whether to access the first cell, or may specify, by using the indication information, a cell or a frequency to be accessed by the terminal device, so that dynamic control is implemented based on network load, and resource utilization of the communication system is improved.

With reference to the third aspect, in some implementations of the third aspect, the terminal device performs cell selection based on the second frequency, and chooses to access the second cell. Alternatively, the terminal device lowers the frequency priority of the first frequency to a frequency priority lower than that of the second frequency, triggers measurement on a cell whose frequency is the second frequency, and reselects the second cell.

According to the solution in this embodiment of this application, the terminal device may adjust a priority of a cell based on a frequency priority, or the terminal device may determine a to-be-accessed cell through cell selection or cell reselection.

With reference to the third aspect, in some implementations of the third aspect, a serving cell of the terminal device is a third cell, and a frequency of the third cell is different from the first frequency. The terminal device changes the serving cell to the first cell through cell selection, cell reselection, or handover.

According to the solution in this embodiment of this application, when the terminal device determines that access is not required, the terminal device may change the serving cell to the first cell through cell selection, cell reselection, or handover, to save power.

With reference to the third aspect, in some implementations of the third aspect, the terminal device receives a first message from the network device, where the first message indicates the frequency priority of the first frequency, or the first message indicates that the first frequency is a frequency in an energy-saving mode. The terminal device measures the first frequency, and changes the serving cell to the first cell.

According to the solution in this embodiment of this application, the network device may indicate a priority of the first cell to the terminal device by using the first message, so that the terminal device changes the serving cell to the first cell in a timely manner. In this way, measurement overheads of the terminal device can be reduced, and load of the communication system can be balanced.

With reference to the third aspect, in some implementations of the third aspect, the first message is a broadcast message or a dedicated radio resource control RRC message.

According to the solution in this embodiment of this application, the network device may simultaneously indicate, to a plurality of terminal devices by using the broadcast message, the priority of the first cell or that the first frequency is a frequency in the energy-saving mode, to save signaling. Alternatively, the network device may indicate, for a single terminal device, the priority of the first cell or that the first frequency is a frequency in the energy-saving mode, to implement flexible scheduling.

According to a fourth aspect, a fourth communication method is provided. The method includes: determining indication information, where the indication information indicates to access a second cell, indicates not to access a first cell, indicates to select a cell based on a second frequency for access, or indicates that a frequency priority of a first frequency is the lowest priority; and sending the indication information to a terminal device through the first cell. A frequency of the first cell is the first frequency, a frequency of the second cell is the second frequency, the first cell is a cell of a first access network device, and the second cell is a cell of a second access network device.

The method may be performed by a fourth communication apparatus. The fourth communication apparatus may be a communication device or a communication apparatus, for example, a chip, that can support the communication device in implementing a function required in the method. For example, the fourth communication apparatus is a network device, a chip that is disposed in the network device and that is configured to implement a function of the network device, or another component configured to implement the function of the network device. In the following description process, an example in which the fourth communication apparatus is a network device is used.

With reference to the fourth aspect, in some implementations of the fourth aspect, the first cell and the second cell meet at least one of the following:

the first frequency is lower than the second frequency;

coverage of the first cell is greater than coverage of the second cell; and a quantity of beams of the first cell is less than a quantity of beams of the second cell.

According to the solution in this embodiment of this application, the first cell may be deployed by using a low frequency beam, to implement wide coverage by using a small quantity of beams. In this way, when the terminal device camps on the first cell, beam measurement overheads can be reduced, and energy consumption of the terminal device can be reduced.

With reference to the fourth aspect, in some implementations of the fourth aspect, the first cell supports only multicast service transmission.

According to the solution in this embodiment of this application, the terminal device may receive only a non-multicast service in the first cell, to reduce RRM measurement overheads. A communication system may implement wide-coverage downlink transmission or multicast transmission by using one access network device, to improve communication efficiency, and reduce network deployment overheads.

With reference to the fourth aspect, in some implementations of the fourth aspect, the indication information is carried in a paging message.

With reference to the fourth aspect, in some implementations of the fourth aspect, a first message is sent to the terminal device, where the first message indicates the frequency priority of the first frequency, or the first message indicates that the first frequency is a frequency in an energy-saving mode.

With reference to the fourth aspect, in some implementations of the fourth aspect, the first message is a broadcast message or a dedicated radio resource control RRC message.

According to a fifth aspect, a communication apparatus is provided. For example, the communication apparatus is the first communication apparatus described above. The first communication apparatus is configured to perform the method according to any one of the first aspect or the possible implementations. Specifically, the first communication apparatus may include modules configured to perform the method according to any one of the first aspect or the possible implementations, for example, include a processing module and a transceiver module. For example, the transceiver module may include a sending module and a receiving module. The sending module and the receiving module may be different functional modules, or may be a same functional module that can implement different functions. For example, the first communication apparatus is a communication device, or is a chip or another component disposed in the communication device. For example, the communication device is a network device. The following uses an example in which the first communication apparatus is a terminal device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the first communication apparatus is a communication device, the transceiver is implemented, for example, by using an antenna, a feeder, and a codec in the communication device. Alternatively, if the first communication apparatus is a chip disposed in the communication device, the transceiver (or the transmitter and the receiver) is, for example, a communication interface in the chip. The communication interface is connected to a radio frequency transceiver component in the communication device, to implement information receiving and sending through the radio frequency transceiver component.

The processing module is configured to determine to camp on a first cell.

The processing module is further configured to determine to access a second cell in response to receiving a paging message from the first cell, in response to determining that there is to-be-transmitted uplink information, or in response to determining that there is a to-be-transmitted non-multicast service.

A frequency of the first cell is a first frequency, and a frequency of the second cell is a second frequency.

In an optional implementation, the first cell and the second cell meet at least one of the following:

the first frequency is lower than the second frequency; coverage of the first cell is greater than coverage of the second cell; and a quantity of beams of the first cell is less than a quantity of beams of the second cell.

In an optional implementation, the first cell does not support uplink transmission, or the first cell supports only multicast service transmission.

In an optional implementation, the determining to access a second cell includes: The processing module determines to access the second cell in response to determining that there is to-be-transmitted uplink information and determining that the first cell does not support uplink transmission. Alternatively, the processing module determines to access the second cell in response to determining that there is to-be-transmitted uplink information and determining that the to-be-transmitted uplink information is a data service. Alternatively, the processing module determines to access the second cell in response to determining that there is a to-be-transmitted non-multicast service and determining that the first cell supports only multicast service transmission.

In an optional implementation, the processing module is further configured to: measure a reference signal of the first cell; and determine to access the second cell when a measurement result is less than a first threshold.

In an optional implementation, the transceiver module is configured to receive indication information from a network device, where the indication information indicates to access the second cell, indicates not to access the first cell, indicates to select a cell based on the second frequency for access, or indicates that a frequency priority of the first frequency is the lowest priority.

In an optional implementation, the processing module is further configured to: perform cell selection based on the second frequency, and choose to access the second cell; or lower the frequency priority of the first frequency to a frequency priority lower than that of the second frequency, trigger measurement on a cell whose frequency is the second frequency, and reselect the second cell.

In an optional implementation, a serving cell of the terminal device is a third cell, and a frequency of the third cell is different from the first frequency; and the processing module is configured to change the serving cell to the first cell through cell selection, cell reselection, or handover.

In an optional implementation, the transceiver module is further configured to receive a first message from the network device, where the first message indicates the frequency priority of the first frequency, or the first message indicates that the first frequency is a frequency in an energy-saving mode. The processing module is further configured to: measure the first frequency, and change the serving cell to the first cell.

In an optional implementation, the first message is a broadcast message or a dedicated radio resource control RRC message.

In an optional implementation, the processing module is further configured to determine, based on at least one of an energy-saving mode of the terminal device, a service activity degree of the terminal device, power of the terminal device, and an access delay of the terminal device, to change the serving cell to the first cell.

For technical effects brought by the fifth aspect or the optional implementations, refer to descriptions of the technical effects brought by the first aspect or the corresponding implementations.

According to a sixth aspect, a communication apparatus is provided. For example, the communication apparatus is the second communication apparatus described above. The second communication apparatus is configured to perform the method according to any one of the second aspect or the possible implementations. Specifically, the second communication apparatus may include modules configured to perform the method according to any one of the second aspect or the possible implementations, for example, include a processing module and a transceiver module. For example, the transceiver module may include a sending module and a receiving module. The sending module and the receiving module may be different functional modules, or may be a same functional module that can implement different functions. For example, the second communication apparatus is a communication device, or is a chip or another component disposed in the communication device. For example, the communication device is a network device. The following uses an example in which the second communication apparatus is a network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the second communication apparatus is a communication device, the transceiver is implemented, for example, by using an antenna, a feeder, and a codec in the communication device. Alternatively, if the second communication apparatus is a chip disposed in the communication device, the transceiver (or the transmitter and the receiver) is, for example, a communication interface in the chip. The communication interface is connected to a radio frequency transceiver component in the communication device, to implement information receiving and sending through the radio frequency transceiver component. In a description process of the sixth aspect, the processing module, the transceiver module, and a case in which the second communication apparatus is a terminal device are still used as examples for description.

The processing module is configured to determine indication information, where the indication information indicates to access a second cell, indicates not to access a first cell, indicates to select a cell based on a second frequency for access, or indicates that a frequency priority of a first frequency is the lowest priority.

The transceiver module is configured to send the indication information to a terminal device through the first cell. A frequency of the first cell is the first frequency, a frequency of the second cell is the second frequency, the first cell is a cell of a first access network device, and the second cell is a cell of a second access network device.

In an optional implementation, the first cell and the second cell meet at least one of the following:

the first frequency is lower than the second frequency;
coverage of the first cell is greater than coverage of the second cell; and
a quantity of beams of the first cell is less than a quantity of beams of the second cell.

In an optional implementation, the first cell does not support uplink transmission, or the first cell supports only multicast service transmission.

In an optional implementation, the indication information is carried in a paging message.

In an optional implementation, the transceiver module is further configured to send a first message to the terminal device, where the first message indicates the frequency priority of the first frequency, or the first message indicates that the first frequency is a frequency in an energy-saving mode.

With reference to the second aspect, in some implementations of the second aspect, the first message is a broadcast message or a dedicated radio resource control RRC message.

For technical effects brought by the sixth aspect or the optional implementations, refer to descriptions of the technical effects brought by the second aspect or the corresponding implementations.

According to a seventh aspect, a communication apparatus is provided. For example, the communication apparatus is the third communication apparatus described above. The third communication apparatus is configured to perform the method according to any one of the third aspect or the possible implementations. Specifically, the third communication apparatus may include modules configured to perform the method according to any one of the third aspect or the possible implementations, for example, include a processing module and a transceiver module. For example, the transceiver module may include a sending module and a receiving module. The sending module and the receiving module may be different functional modules, or may be a same functional module that can implement different functions. For example, the third communication apparatus is a communication device, or is a chip or another component disposed in the communication device. For example, the communication device is a terminal device. The following uses an example in which the third communication apparatus is a terminal device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different functional modules, or may be a same functional module that can implement different functions. If the third communication apparatus is a communication device, the transceiver is implemented, for example, by using an antenna, a feeder, and a codec in the communication device. Alternatively, if the third communication apparatus is a chip disposed in the communication device, the transceiver (or the transmitter and the receiver) is, for example, a communication interface in the chip. The communication interface is connected to a radio frequency transceiver component in the communication device, to implement information receiving and sending through the radio frequency transceiver component. In a description process of the seventh aspect, the processing module, the transceiver module, and a case in which the third communication apparatus is a terminal device are still used as examples for description.

The processing module is configured to determine to camp on a first cell.

The processing module further determines to access a second cell in response to determining that there is a to-be-transmitted non-multicast service. A frequency of the first cell is a first frequency, and a frequency of the second cell is a second frequency.

In an optional implementation, the first cell and the second cell meet at least one of the following:

the first frequency is lower than the second frequency;
coverage of the first cell is greater than coverage of the second cell; and
a quantity of beams of the first cell is less than a quantity of beams of the second cell.

In an optional implementation, the first cell supports only multicast service transmission.

In an optional implementation, the processing module determines to access the second cell in response to determining that there is a to-be-transmitted non-multicast service and determining that the first cell supports only multicast service transmission.

In an optional implementation, the transceiver module measures a reference signal of the first cell, and the processing module determines to access the second cell when a measurement result is less than a first threshold.

In an optional implementation, the transceiver module is configured to receive indication information from a network device, where the indication information indicates to access the second cell, indicates not to access the first cell, indicates to select a cell based on the second frequency for access, or indicates that a frequency priority of the first frequency is the lowest priority.

In an optional implementation, the transceiver module is configured to: perform cell selection based on the second frequency, and choose to access the second cell; or lower the frequency priority of the first frequency to a frequency priority lower than that of the second frequency, trigger measurement on a cell whose frequency is the second frequency, and reselect the second cell.

In an optional implementation, a serving cell of the terminal device is a third cell, and a frequency of the third cell is different from the first frequency; and the transceiver module is configured to change the serving cell to the first cell through cell selection, cell reselection, or handover.

In an optional implementation, the transceiver module is configured to receive a first message from the network device, where the first message indicates the frequency priority of the first frequency, or the first message indicates that the first frequency is a frequency in an energy-saving mode. The terminal device measures the first frequency, and changes the serving cell to the first cell.

In an optional implementation, the first message is a broadcast message or a dedicated radio resource control RRC message.

For technical effects brought by the seventh aspect or the optional implementations, refer to descriptions of the technical effects brought by the third aspect or the corresponding implementations.

According to an eighth aspect, a communication apparatus is provided. For example, the communication apparatus is the fourth communication apparatus described above. The fourth communication apparatus is configured to perform the method according to any one of the fourth aspect or the possible implementations. Specifically, the fourth communication apparatus may include modules configured to perform the method according to any one of the fourth aspect or the possible implementations, for example, include a processing module and a transceiver module. For example, the transceiver module may include a sending module and a receiving module. The sending module and the receiving module may be different functional modules, or may be a same functional module that can implement different functions. For example, the fourth communication apparatus is a communication device, or is a chip or another component disposed in the communication device. For example, the communication device is a network device. The following uses an example in which the fourth communication apparatus is a network device. For example, the transceiver module may alternatively be implemented by using a transceiver, and the processing module may alternatively be implemented by using a processor. Alternatively, the sending module may be implemented by using a transmitter, and the receiving module may be implemented by using a receiver.

The transmitter and the receiver may be different functional modules, or may be a same functional module that can implement different functions. If the fourth communication apparatus is a communication device, the transceiver is implemented, for example, by using an antenna, a feeder, and a codec in the communication device. Alternatively, if the fourth communication apparatus is a chip disposed in the communication device, the transceiver (or the transmitter and the receiver) is, for example, a communication interface in the chip. The communication interface is connected to a radio frequency transceiver component in the communication device, to implement information receiving and sending through the radio frequency transceiver component. In a description process of the eighth aspect, the processing module, the transceiver module, and a case in which the fourth communication apparatus is a terminal device are still used as examples for description.

The processing module is configured to determine indication information, where the indication information indicates to access a second cell, indicates not to access a first cell, indicates to select a cell based on a second frequency for access, or indicates that a frequency priority of a first frequency is the lowest priority.

The transceiver module is configured to send the indication information to a terminal device through the first cell. A frequency of the first cell is the first frequency, a frequency of the second cell is the second frequency, the first cell is a cell of a first access network device, and the second cell is a cell of a second access network device.

In an optional implementation, the first cell and the second cell meet at least one of the following:

the first frequency is lower than the second frequency;

coverage of the first cell is greater than coverage of the second cell; and a quantity of beams of the first cell is less than a quantity of beams of the second cell.

In an optional implementation, the first cell supports only multicast service transmission.

In an optional implementation, the indication information is carried in a paging message.

In an optional implementation, the transceiver module is further configured to send a first message to the terminal device, where the first message indicates the frequency priority of the first frequency, or the first message indicates that the first frequency is a frequency in an energy-saving mode.

In an optional implementation, the first message is a broadcast message or a dedicated radio resource control RRC message.

For technical effects brought by the eighth aspect or the optional implementations, refer to descriptions of the technical effects brought by the fourth aspect or the corresponding implementations.

According to a ninth aspect, a communication apparatus is provided. The communication apparatus is, for example, the first communication apparatus described above. The communication apparatus includes a processor. Optionally, the communication apparatus may further include a memory, configured to store computer instructions. The processor and the memory are coupled to each other, and are configured to implement the method according to the first aspect or the possible implementations. Alternatively, the first communication apparatus may not include a memory, and the memory may be located outside the first communication apparatus. Optionally, the first communication apparatus may further include a communication interface, configured to communicate with another apparatus or device.

The processor, the memory, and the communication interface are coupled to each other, and are configured to implement the method according to the first aspect or the possible implementations. For example, when the processor executes the computer instructions stored in the memory, the first communication apparatus is enabled to perform the method according to any one of the first aspect or the possible implementations. For example, the first communication apparatus is a communication device, or is a chip or another component disposed in the communication device. For example, the communication device is a terminal device.

If the first communication apparatus is a communication device, the communication interface is implemented, for example, by using a transceiver (or a transmitter and a receiver) in the communication device, and the transceiver is implemented, for example, by using an antenna, a feeder, and a codec in the communication device. Alternatively, if the first communication apparatus is a chip disposed in the communication device, the communication interface is, for example, an input/output interface such as an input/output pin of the chip. The communication interface is connected to a radio frequency transceiver component in the communication device, to implement information receiving and sending through the radio frequency transceiver component.

According to a tenth aspect, a communication apparatus is provided. The communication apparatus is, for example, the second communication apparatus described above. The communication apparatus includes a processor. Optionally, the communication apparatus may further include a memory, configured to store computer instructions. The processor and the memory are coupled to each other, and are configured to implement the method according to the second aspect or the possible implementations. Alternatively, the second communication apparatus may not include a memory, and the memory may be located outside the second communication apparatus. Optionally, the second communication apparatus may further include a communication interface, configured to communicate with another apparatus or device. The processor, the memory, and the communication interface are coupled to each other, and are configured to implement the method according to the second aspect or the possible implementations. For example, when the processor executes the computer instructions stored in the memory, the second communication apparatus is enabled to perform the method according to any one of the second aspect or the possible implementations. For example, the second communication apparatus is a communication device, or is a chip or another component disposed in the communication device. For example, the communication device is a network device.

If the second communication apparatus is a communication device, the communication interface is implemented, for example, by using a transceiver (or a transmitter and a receiver) in the communication device, and the transceiver is implemented, for example, by using an antenna, a feeder, and a codec in the communication device. Alternatively, if the second communication apparatus is a chip disposed in the communication device, the communication interface is, for example, an input/output interface such as an input/output pin of the chip. The communication interface is connected to a radio frequency transceiver component in the communication device, to implement information receiving and sending through the radio frequency transceiver component.

According to an eleventh aspect, a communication apparatus is provided. The communication apparatus is, for example, the third communication apparatus described above. The communication apparatus includes a processor. Optionally, the communication apparatus may further include a memory, configured to store computer instructions. The processor and the memory are coupled to each other, to implement the method according to the third aspect or the possible implementations. Alternatively, the third communication apparatus may not include a memory, and the memory may be located outside the third communication apparatus. Optionally, the third communication apparatus may further include a communication interface, configured to communicate with another apparatus or device. The processor, the memory, and the communication interface are coupled to each other, to implement the method according to the third aspect or the possible implementations. For example, when the processor executes the computer instructions stored in the memory, the third communication apparatus is enabled to perform the method according to any one of the third aspect or the possible implementations. For example, the third communication apparatus is a communication device, or is a chip or another component disposed in the communication device. For example, the communication device is a terminal device.

If the third communication apparatus is a communication device, the communication interface is implemented, for example, by using a transceiver (or a transmitter and a receiver) in the communication device, and the transceiver is implemented, for example, by using an antenna, a feeder, and a codec in the communication device. Alternatively, if the third communication apparatus is a chip disposed in the communication device, the communication interface is, for example, an input/output interface such as an input/output pin of the chip. The communication interface is connected to a radio frequency transceiver component in the communication device, to implement information receiving and sending through the radio frequency transceiver component.

According to a twelfth aspect, a communication apparatus is provided. The communication apparatus is, for example, the fourth communication apparatus described above. The communication apparatus includes a processor. Optionally, the communication apparatus may further include a memory, configured to store computer instructions. The processor and the memory are coupled to each other, to implement the method according to the fourth aspect or the possible implementations. Alternatively, the fourth communication apparatus may not include a memory, and the memory may be located outside the fourth communication apparatus. Optionally, the fourth communication apparatus may further include a communication interface, configured to communicate with another apparatus or device. The processor, the memory, and the communication interface are coupled to each other, to implement the method according to the fourth aspect or the possible implementations. For example, when the processor executes the computer instructions stored in the memory, the fourth communication apparatus is enabled to perform the method according to any one of the fourth aspect or the possible implementations. For example, the fourth communication apparatus is a communication device, or is a chip or another component disposed in the communication device. For example, the communication device is a network device.

If the fourth communication apparatus is a communication device, the communication interface is implemented, for example, by using a transceiver (or a transmitter and a receiver) in the communication device, and the transceiver is implemented, for example, by using an antenna, a feeder, and a codec in the communication device. Alternatively, if the fourth communication apparatus is a chip disposed in the communication device, the communication interface is, for example, an input/output interface such as an input/output pin of the chip. The communication interface is connected to a radio frequency transceiver component in the communication device, to implement information receiving and sending through the radio frequency transceiver component.

According to a thirteenth aspect, a chip system is provided. The chip system includes a processor and a communication interface. The processor is coupled to the communication interface, and is configured to implement the method according to any one of the first aspect or the optional implementations.

Optionally, the chip system may further include a memory. For example, the processor may read and execute a software program stored in the memory, to implement the method according to any one of the first aspect or the optional implementations. Alternatively, the memory may not be included in the chip system, but is located outside the chip system. That is, the processor may read and execute a software program stored in an external memory, to implement the method according to any one of the first aspect or the optional implementations.

According to a fourteenth aspect, a chip system is provided. The chip system includes a processor and a communication interface. The processor is coupled to the communication interface, and is configured to implement the method according to any one of the second aspect or the optional implementations.

Optionally, the chip system may further include a memory. For example, the processor may read and execute a software program stored in the memory, to implement the method according to any one of the second aspect or the optional implementations. Alternatively, the memory may not be included in the chip system, but is located outside the chip system. That is, the processor may read and execute a software program stored in an external memory, to implement the method according to any one of the second aspect or the optional implementations.

According to a fifteenth aspect, a chip system is provided. The chip system includes a processor and a communication interface. The processor is coupled to the communication interface, and is configured to implement the method according to any one of the third aspect or the optional implementations.

Optionally, the chip system may further include a memory. For example, the processor may read and execute a software program stored in the memory, to implement the method according to any one of the third aspect or the optional implementations. Alternatively, the memory may not be included in the chip system, but is located outside the chip system. That is, the processor may read and execute a software program stored in an external memory, to implement the method according to any one of the third aspect or the optional implementations.

According to a sixteenth aspect, a chip system is provided. The chip system includes a processor and a communication interface. The processor is coupled to the communication interface, and is configured to implement the method according to any one of the fourth aspect or the optional implementations.

Optionally, the chip system may further include a memory. For example, the processor may read and execute a software program stored in the memory, to implement the method according to any one of the fourth aspect or the optional implementations. Alternatively, the memory may not be included in the chip system, but is located outside the chip system. That is, the processor may read and execute a software program stored in an external memory, to implement the method according to any one of the fourth aspect or the optional implementations.

According to a seventeenth aspect, a first communication system is provided. The communication system includes the communication apparatus according to the fifth aspect, the communication apparatus according to the ninth aspect, or the communication apparatus according to the thirteenth aspect, and includes the communication apparatus according to the sixth aspect, the communication apparatus according to the tenth aspect, or the communication apparatus according to the fourteenth aspect.

According to an eighteenth aspect, a second communication system is provided.

The communication system includes the communication apparatus according to the seventh aspect, the communication apparatus according to the eleventh aspect, or the communication apparatus according to the fifteenth aspect, and includes the communication apparatus according to the eighth aspect, the communication apparatus according to the twelfth aspect, or the communication apparatus according to the sixteenth aspect.

According to a nineteenth aspect, a computer-readable storage medium is provided. The computer-readable storage medium is configured to store computer instructions. When the computer instructions are run on a computer, the computer is enabled to perform the method according to any one of the first aspect or the possible implementations.

According to a twentieth aspect, a computer-readable storage medium is provided. The computer-readable storage medium is configured to store computer instructions. When the computer instructions are run on a computer, the computer is enabled to perform the method according to any one of the second aspect or the possible implementations.

According to a twenty-first aspect, a computer-readable storage medium is provided. The computer-readable storage medium is configured to store computer instructions. When the computer instructions are run on a computer, the computer is enabled to perform the method according to any one of the third aspect or the possible implementations.

According to a twenty-second aspect, a computer-readable storage medium is provided. The computer-readable storage medium is configured to store computer instructions. When the computer instructions are run on a computer, the computer is enabled to perform the method according to any one of the fourth aspect or the possible implementations.

According to a twenty-third aspect, a computer program product including instructions is provided. The computer program product is configured to store computer instructions. When the computer instructions are run on a computer, the computer is enabled to perform the method according to any one of the first aspect or the possible implementations.

According to a twenty-fourth aspect, a computer program product including instructions is provided. The computer program product is configured to store computer instructions. When the computer instructions are run on a computer, the computer is enabled to perform the method according to any one of the second aspect or the possible implementations.

According to a twenty-fifth aspect, a computer program product including instructions is provided. The computer program product is configured to store computer instructions. When the computer instructions are run on a computer, the computer is enabled to perform the method according to any one of the third aspect or the possible implementations.

According to a twenty-sixth aspect, a computer program product including instructions is provided. The computer program product is configured to store computer instructions. When the computer instructions are run on a computer, the computer is enabled to perform the method according to any one of the fourth aspect or the possible implementations.

According to a twenty-seventh aspect, a communication method, a corresponding communication apparatus, and a communication system are provided. A terminal device camps on a first frequency, receives access information corresponding to a second frequency at the first frequency, and further accesses the second frequency based on the access information. In this solution, the terminal device may camp on the first frequency when the terminal device is in an RRC idle state, and receive downlink information at the first frequency, to reduce RRM measurement consumption. When the terminal device needs to perform service transmission, the terminal device may access the second frequency to obtain a communication service, where the first frequency is different from the second frequency. The access information corresponding to the second frequency is received at the first frequency, so that overheads of receiving a broadcast message in a second cell and performing cell selection or cell reselection measurement can be reduced. Therefore, access efficiency is improved, and consumption is reduced.

In an optional implementation, the terminal device sends a sounding signal to a second access network device. The sounding signal is a specific code sequence or a reference signal. The sounding signal is sent to the second access network device, so that the second access network device can determine a location of the terminal device, and further determine access assistance information required by the terminal device to access the second frequency.

In an optional implementation, the access information received by the terminal device at the first frequency includes configuration information of at least one second cell, and the configuration information of the second cell includes at least one of the following: identification information of the second cell, for example, a physical cell identifier (physical cell identifier, PCI) or a cell identifier (cell identifier, CI), frequency point information of the second frequency, configuration information of a reference signal of the second cell, access resource information of the second cell, system information of the second cell, and a measurement result of the sounding signal.

In an optional implementation, the access information includes the identification information of the second cell, and after obtaining cell timing based on an SSB or a CSI-RS, the terminal device reads a SIB 1 to obtain random access configuration information, and then performs random access based on the random access configuration information. Alternatively, the access information includes scheduling configuration information of a SIB 1, and the terminal may determine scheduling of the SIB 1 based on the scheduling configuration information of the SIB 1 in the access resource information, and receive the SIB 1 according to the scheduling.

In another optional implementation, the access information includes configuration information of a random access resource and an ID of the second cell, where the configuration information of the random access resource includes at least one of an access occasion configuration, a frequency configuration, and a preamble configuration of the random access resource.

In still another optional implementation, the access information includes grant information of a message 3 (Msg3) of the second cell. The terminal device may send the Msg3 to a base station based on the grant information of the Msg3, without a need to initiate a complete random access procedure in the second cell, so that communication efficiency is improved. Further, the terminal device may include a preferred beam identifier in the Msg3, to request the access network device to schedule the terminal device based on the beam identifier.

According to a twenty-eighth aspect, a communication method, a corresponding communication apparatus, and a communication system are provided. A second access network device receives a sounding signal from a terminal device, and determines access assistance information corresponding to the terminal device. Further, the second access network device sends the access assistance information to a first access network device. In this solution, the second access network device may determine a location of the terminal device by detecting the sounding signal from the terminal device, and further send, to the terminal device at a first frequency, access assistance information corresponding to a second frequency, to improve efficiency of accessing the second frequency by the terminal device. It should be noted that the first access network device and the second access network device may be a same device. In this case, message sending between the two access network devices does not need to be performed.

In an optional implementation, the access assistance information includes configuration information of at least one second cell, and the configuration information of the second cell includes at least one of the following: identification information of the second cell, for example, a physical cell identifier (physical cell identifier, PCI) or a cell identifier (cell identifier, CI), frequency point information of the second frequency, configuration information of a reference signal of the second cell, access resource information of the second cell, system information of the second cell, and a measurement result of the sounding signal.

According to a twenty-ninth aspect, a communication method, a corresponding communication apparatus, and a communication system are provided. A first access network device receives access assistance information from a second access network device, where the access assistance information is used by a terminal device to access a second frequency. The first access network device determines access information based on the access assistance information, and sends the access information to the terminal device at a first frequency. In this solution, the first access network device may send, to the terminal device at the first frequency, the access information corresponding to the second frequency, to reduce a delay and consumption of receiving a broadcast message or performing cell selection and cell reselection by the terminal device, and improve communication efficiency. It should be noted that the first access network device and the second access network device may be a same device. In this case, message sending between the two access network devices does not need to be performed.

In an optional implementation, the first access network device receives access assistance information from a plurality of second access network devices. Further, the first access network device selects at least one second access network device from the plurality of second access network devices, and determines access information based on access assistance information corresponding to the selected second access network device. Optionally, the access assistance information includes a result of measuring a sounding signal by the second access network device, and the measurement result indicates quality of the sounding signal received by the second access network device. In this case, the first access network device may select, based on measurement results, a second access network device with high quality of communication with the terminal device, to improve communication quality after the terminal device accesses the second frequency, and reduce power consumption of cell reselection performed by the terminal device.

According to a thirtieth aspect, a communication apparatus is provided. The communication apparatus may be the terminal device according to the twenty-seventh aspect, or an electronic device configured in the terminal device, or a large device including the terminal device. The terminal device includes a corresponding means (means) or module configured to perform the foregoing method. For example, the communication apparatus includes a processing unit (sometimes referred to as a processing module) and a transceiver unit (sometimes referred to as a transceiver module). The processing unit is configured to camp on a first frequency through the transceiver unit, the transceiver unit is configured to receive access information corresponding to a second frequency at the first frequency, and the processing unit is further configured to access the second frequency through the transceiver unit.

For another example, the communication apparatus includes a processor, coupled to a memory, and configured to execute instructions in the memory, to implement the method performed by the terminal device in the twenty-seventh aspect. Optionally, the communication apparatus further includes other components, for example, an antenna, an input/output module, and an interface. These components may be hardware, software, or a combination of software and hardware.

According to a thirty-first aspect, a communication apparatus is provided. The communication apparatus may be the first access network device and/or the second access network device according to the twenty-eighth aspect or the twenty-ninth aspect. The communication apparatus has a function of the first access network device, a function of the second access network device, or functions of the first access network device and the second access network device. The first access network device is, for example, a base station or a baseband apparatus in the base station, and/or the second access network device is, for example, a base station or a baseband apparatus in the base station. In an optional implementation, the communication apparatus includes a baseband apparatus and a radio frequency apparatus. In another optional implementation, the communication apparatus includes a processing unit (sometimes referred to as a processing module) and a transceiver unit (sometimes referred to as a transceiver module).

In an optional implementation, the communication apparatus includes a processing unit, configured to: be coupled to a storage unit, and execute a program or instructions in the storage unit to enable the communication apparatus to perform the function of the first access network device and/or the function of the second access network device.

According to a thirty-second aspect, a computer-readable storage medium is provided. The computer-readable storage medium is configured to store a computer program or instructions. When the computer program or the instructions are run, the method performed by the terminal device, the first access network device, or the second access network device in the foregoing aspects is implemented.

According to a thirty-third aspect, a computer program product including instructions is provided. When the computer program product runs on a computer, the method in the foregoing aspects is implemented.

In embodiments of this application, only downlink transmission or only non-multicast service transmission is performed in the first cell, so that overheads of performing RRM measurement and receiving system information by the terminal device can be reduced, and power can be saved.

BRIEF DESCRIPTION OF DRAWINGS

FIG. 5 is another flowchart of the first communication method according to this embodiment of this application;

FIG. 6 is a flowchart of a second communication method according to an embodiment of this application;

DESCRIPTION OF EMBODIMENTS

Figure 1:
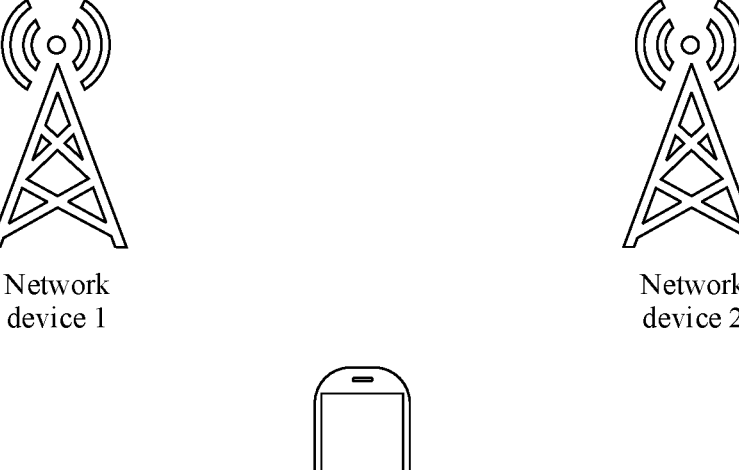
FIG. 1 is a schematic diagram of an application scenario according to an embodiment of this application.

To make objectives, technical solutions, and advantages of embodiments of this application clearer, the following further describes embodiments of this application in detail with reference to the accompanying drawings.

The following describes some terms in embodiments of this application, to facilitate understanding of a person skilled in the art.

(1) A terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function, or a processing device connected to a wireless modem. The terminal device may communicate with a core network through a radio access network (RAN), and exchange a voice or data with the RAN, or interact a voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

In embodiments of this application, the terminal device may further include a relay. Alternatively, it is understood as that any device that can perform data communication with a base station may be considered as a terminal device.

In embodiments of this application, an apparatus configured to implement a function of the terminal device may be a terminal device, or may be an apparatus, for example, a chip system, that can support the terminal device in implementing the function. The apparatus may be installed in the terminal device. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is a terminal device.

(2) A network device includes, for example, an access network (AN) device such as a base station (for example, an access point), and may be a device that is in an access network and that communicates with a wireless terminal device over an air interface through one or more cells. Alternatively, the network device is, for example, a road side unit (RSU) in a vehicle-to-everything (V2X) technology. The base station may be configured to perform mutual conversion between a received over-the-air frame and an IP packet and serve as a router between the terminal device and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB) in an LTE system or a long term evolution-advanced (long term evolution-advanced, LTE-A) system, may include a next generation NodeB (gNB) in a 5th generation mobile communication technology (5th generation, 5G) NR system (also referred to as an NR system for short), or may include a centralized unit (CU) and a distributed unit (DU) in a cloud radio access network (Cloud RAN) system. This is not limited in embodiments of this application.

The network device may further include a core network device. The core network device includes, for example, an access and mobility management function (AMF) or a user plane function (UPF). Embodiments of this application mainly relate to the access network. Therefore, the network device below is an access network device unless otherwise specified.

In embodiments of this application, an apparatus configured to implement a function of the network device may be a network device, or may be an apparatus, for example, a chip system, that can support the network device in implementing the function. The apparatus may be installed in the network device. In the technical solutions provided in embodiments of this application, the technical solutions provided in embodiments of this application are described by using an example in which the apparatus configured to implement the function of the network device is a network device.

(3) RRC state: A terminal device has three RRC states: an RRC connected state, an RRC idle state, and an RRC inactive state.

RRC connected state (also briefly referred to as a connected state, where in this specification, the "connected state" and the "RRC connected state" are a same concept, and may be interchanged): The terminal device establishes an RRC connection to a network, and may transmit data.

RRC idle (idle) state (also briefly referred to as an idle state, where in this specification, the "idle state" and the "RRC idle state" are a same concept, and may be interchanged): The terminal device does not establish an RRC connection to a network, and a base station does not store a context of the terminal device. If the terminal device needs to enter the RRC connected state from the RRC idle state, the terminal device needs to initiate an RRC connection establishment process.

RRC inactive state (also briefly referred to as an inactive state, where in this specification, a "non-active state", a "deactivated state", the "inactive state", the "RRC inactive state", an "RRC deactivated state", and the like are a same concept, and may be interchanged): The terminal device previously enters the RRC connected state through an anchor base station. Then, the anchor base station releases an RRC connection, but stores a context of the terminal device. If the terminal device needs to re-enter the RRC connected state from the RRC inactive state, the terminal device needs to initiate an RRC connection resume process (or referred to as an RRC connection reestablishment process) through a base station on which the terminal device currently camps. Because the terminal device may be in a moving state, the base station on which the terminal device currently camps and the anchor base station of the terminal device may be a same base station, or may be different base stations. Compared with the RRC establishment process, the RRC resume process has a shorter delay and lower signaling overheads. However, the base station needs to store the context of the terminal device. This causes storage overheads of the base station.

(4) A multicast transmission technology is a transmission technology in which a sender sends data and a plurality of receivers receive the data. For example, an access network device sends data and a plurality of terminal devices receive the data. A possible multicast transmission technology is a single-cell point-to-multipoint (SC-PTM) technology. In the SC-PTM technology, a physical downlink shared channel (PDSCH) may be used to transmit data of a multicast service. Different from a PDSCH carrying a unicast service, the PDSCH carrying the multicast service may be referred to as a multicast PDSCH. The access network device may pre-configure an association relationship between the multicast service and a group radio network temporary identifier (G-RNTI), where each multicast service may be associated with one G-RNTI.

During unicast transmission, the access network device may send, to the terminal device, control information (for example, downlink control information (DCI)) carried on a physical downlink control channel (PDCCH). The DCI is used to schedule a unicast PDSCH carrying a service (where the service may be a unicast service or a multicast service). The DCI may be scrambled by using a cell radio network temporary identifier (C-RNTI). Correspondingly, after detecting the DCI based on the C-RNTI, the terminal device may receive the unicast PDSCH based on scheduling information included in the DCI.

Similarly, during multicast transmission, the access network device may send DCI to a plurality of terminal devices interested in a multicast service, where the DCI is used to schedule information about the multicast service, and the information about the multicast service may be carried in a multicast PDSCH. The DCI may be scrambled by using a G-RNTI associated with the multicast service. Correspondingly, after detecting the DCI based on the G-RNTI associated with the multicast service, the plurality of terminal devices may receive the information about the multicast service based on scheduling information included in the DCI.

(5) Mobility management is an important part of wireless mobile communication. The mobility management is a general term of related content involved to ensure that a communication link between a network and a terminal device is not interrupted due to movement of the terminal device. Based on states of the terminal device, mobility management may be roughly classified into two parts: mobility management in an RRC idle state and mobility management in an RRC connected state. The mobility management in the RRC idle state mainly refers to a cell selection/reselection process. The mobility management in the RRC connected state mainly refers to a cell handover process. Both cell selection/reselection and cell handover are performed based on measurement results. Therefore, RRM measurement is a basis of the mobility management.

The RRM measurement includes measurement of a serving cell of the terminal device, and further includes measurement of a neighboring cell, for example, measurement of a neighboring cell in a same communication system, or measurement of a neighboring cell in a different system. Based on layers used in measurement, the measurement can be classified into physical layer measurement (layer 1 measurement) and RRC layer measurement (layer 3 measurement).

(6) Terms "system" and "network" in embodiments of this application may be used interchangeably. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

In addition, unless otherwise stated, in embodiments of this application, ordinal numbers such as "first" and "second" are intended to distinguish between a plurality of objects, but are not intended to limit sizes, content, orders, time sequences, priorities, importance, or the like of the plurality of objects. For example, a first paging message and a second paging message are merely intended to distinguish between different paging messages, but do not indicate that sizes, content, sending sequences, priorities, importance degrees, or the like of the two paging messages are different.

The technical solutions provided in embodiments of this application may be applied to a 4th generation mobile communication technology (4th generation, 4G) system, for example, an LTE system, may be applied to a 5G system, for example, an NR system, or may be applied to a next generation mobile communication system or another similar communication system. This is not specifically limited.

FIG. 1 shows an application scenario according to an embodiment of this application. FIG. 1 includes a network device 1, a network device 2, and a terminal device. The terminal device may communicate with the network device 2 while receiving information from the network device 1. The network device 1 operates, for example, in an evolved universal mobile telecommunications system terrestrial radio access (E-UTRA) system, an NR system, a next generation communication system, or another communication system. The network device 2 operates, for example, in the E-UTRA system, the NR system, the next generation communication system, or another communication system. The network device 1 and the network device 2 may operate in a same communication system, for example, both operate in the E-UTRA system. Alternatively, the network device 1 and the network device 2 may operate in different communication systems. For example, the network device 1 operates in the E-UTRA system, and the network device 2 operates in the NR system.

Figure 2:
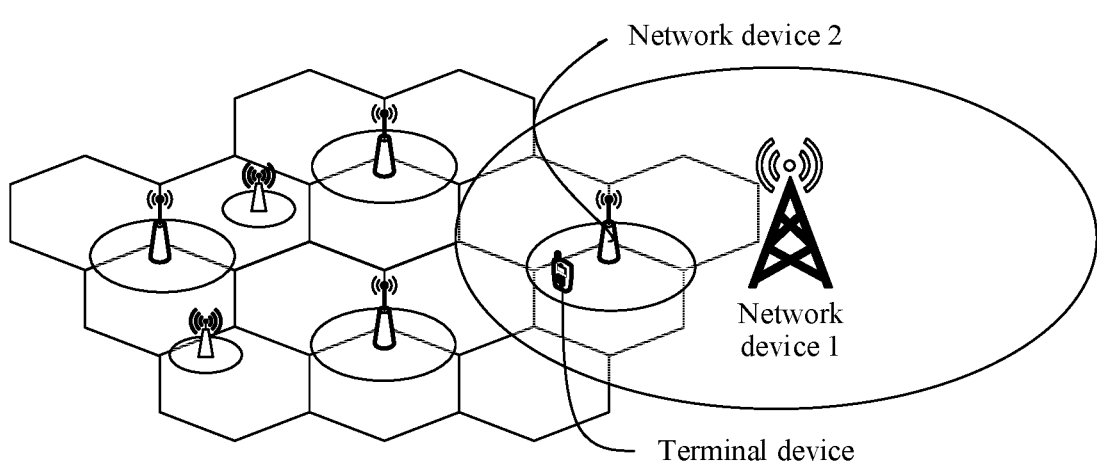
FIG. 2 is a schematic diagram of another application scenario according to an embodiment of this application.

FIG. 2 shows another application scenario according to an embodiment of this application. FIG. 2 includes a network device 1, a network device 2, and a terminal device. Signal coverage of the network device 1 is large, and coverage of the network device 2 is small. A communication scenario shown in FIG. 2 may be understood as that a dense urban area gradually transits to an urban area, a county, a town, and a rural area. In the dense urban area, a population density is high and communication terminals are densely deployed. Therefore, more network devices and more precise network devices are required to provide services. However, in an open scenario, for example, the rural area, a small quantity of large network devices may be used to implement coverage, so that deployment overheads of network devices are reduced. The terminal device shown in the figure is located in service areas of both the network device 1 and the network device 2, and can communicate with the network device 2 when receiving information from the network device 1. Specifically, the network device 1 may be, for example, a broadcast television transmitter tower. Such a high-power large tower has characteristics of wide coverage and a high antenna height. A signal coverage radius of the large tower may reach dozens of kilometers. The network device 2 may be, for example, a base station with a common function. For ease of description, the common base station is referred to as a small tower in this application. Because the coverage radius of the large tower is excessively large, communication quality of uplink transmission between the terminal device and the large tower may be low, or consumption of RRM measurement performed by the terminal device is high.

Figures 3, 4:
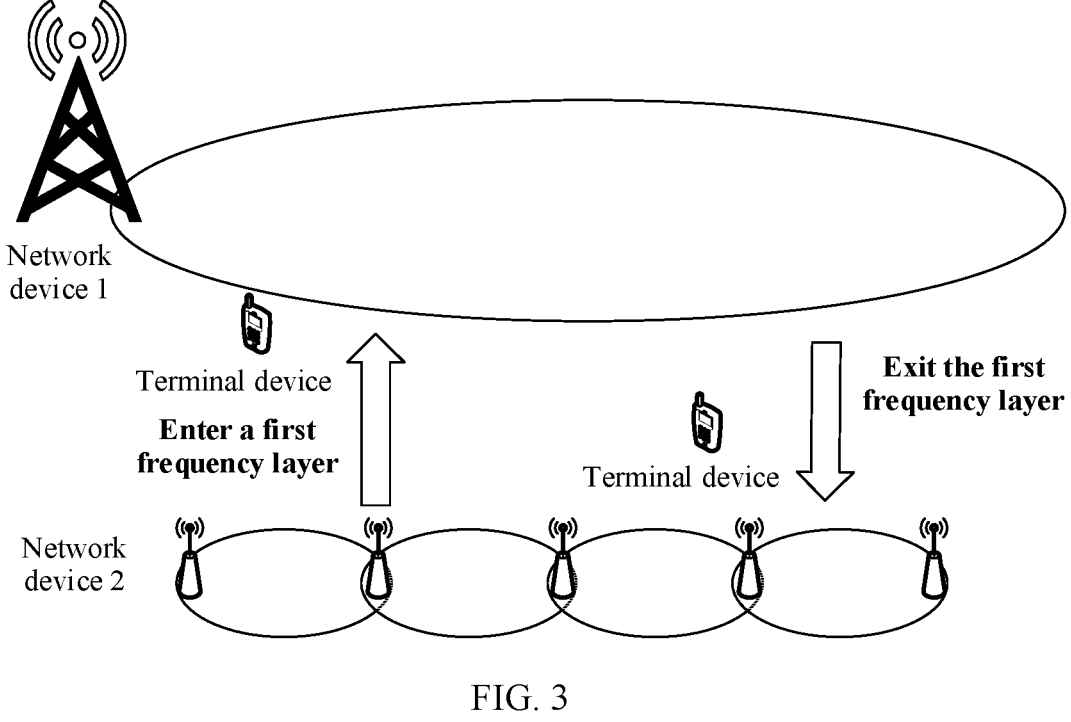
FIG. 3 is a schematic diagram of entering and exiting a first frequency layer according to an embodiment of this application.
FIG. 4 is a flowchart of a first communication method according to an embodiment of this application.

In view of this, the technical solutions in embodiments of this application are provided. In embodiments of this application, when there is no uplink service requirement, the terminal device may receive downlink information from the network device 1, and does not need to perform RRM measurement. When there is an uplink service requirement, the terminal device obtains a service through the network device 2. Further, in a communication scenario of a large tower and a small tower, when there is no uplink service requirement, the terminal device may receive a downlink service or a multicast service through only the large tower. The large tower has large coverage and a small quantity of low-frequency beams, so that RRM measurement consumption can be reduced, and power can be saved. When there is an uplink service requirement, communication is performed through the small tower, and communication quality is not affected. As shown in FIG. 3, communication coverage of a network device 1 corresponds to a first frequency layer, and coverage of another network device may be understood as a second frequency layer. Coverage of a single cell in the first frequency layer is greater than coverage of a single cell in the second frequency. A terminal device may enter the first frequency layer when there is no uplink service requirement, to implement energy saving; and exit the first frequency layer when there is an uplink service requirement, to perform communication. It should be noted that a condition for entering the first frequency layer and a condition for exiting the frequency layer are not limited to whether there is an uplink service requirement. The foregoing descriptions are merely an example, and details are described in the following by using embodiments.

The network device in FIG. 1, FIG. 2, or FIG. 3 is, for example, a base station. The network device corresponds to different devices in different systems. For example, the network device may correspond to an eNB in a 4G system, and correspond to a 5G access network device such as a gNB in a 5G system. Certainly, the technical solutions provided in embodiments of this application may also be applied to a future mobile communication system. Therefore, the network device in FIG. 2 or FIG. 3 may also correspond to a network device in the future mobile communication system.

FIG. 1, FIG. 2, or FIG. 3 uses an example in which the network device is a base station. Actually, with reference to the foregoing descriptions, the network device may alternatively be a device such as an RSU. In addition, FIG. 1, FIG. 2, or FIG. 3 uses an example in which the terminal device is a mobile phone. Actually, it can be learned based on the foregoing descriptions of the terminal device that the terminal device in embodiments of this application is not limited to the mobile phone.

For ease of description, an example in which a method is performed by a network device and a terminal device is used below. Embodiments of this application use an example in which embodiments of this application are applied to a network architecture shown in FIG. 1 or FIG. 2. Therefore, if embodiments of this application are applied to a network architecture shown in FIG. 1, in the following descriptions, a first access network device may be the network device 1 in the network architecture shown in FIG. 1, a second access network device may be the network device 2 in the network architecture shown in FIG. 1, and a terminal device may be the terminal device in the network architecture shown in FIG. 1. Alternatively, if embodiments of this application are applied to a network architecture shown in FIG. 2, in the following descriptions, a first access network device may be the network device 1 in the network architecture shown in FIG. 2, a second access network device may be the network device 2 in the network architecture shown in FIG. 2, and a terminal device may be the terminal device in the network architecture shown in FIG. 2.

Embodiment 1

As shown in FIG. 4, an embodiment of this application provides a communication method, including steps S401 and S402.

S401: A terminal device camps on a first cell.

S402: Determine to access a second cell in response to receiving a paging message from the first cell, in response to determining that there is to-be-transmitted uplink information, or in response to determining that there is a to-be-transmitted non-multicast service.

The first cell and the second cell may be different cells, a downlink frequency of the first cell is a first frequency, and a downlink frequency of the second cell is a second frequency.

Alternatively, the first cell and the second cell may be a same cell. For example, the first cell and the second cell have a same cell global identifier (CGI) or a same uplink frequency. In this case, it may be understood that the cell has two downlink frequencies: the first frequency and the second frequency. The first frequency is a frequency on which the terminal device camps, and the second frequency is a downlink reference frequency after the terminal device accesses the cell. When the terminal device is in a power-saving state (for example, an idle state, an inactive state, or a DRX state), the terminal device may camp on the first frequency. When the terminal device needs to perform data receiving and sending, the terminal device needs to perform timing synchronization and RRM measurement based on a reference signal of the second frequency.

For ease of describing the foregoing two cases, the following uniformly uses the first cell to describe a cell deployed at the first frequency, and uses the second cell to describe a cell deployed at the second frequency. It should be understood that the first cell and the second cell may be a same cell. When the two cells are a same cell, the first cell is a first downlink frequency of the cell, and the second cell is a second downlink frequency of the cell.

According to the communication method provided in this embodiment of this application, the terminal device may camp on the first cell when the terminal device is in the idle state and receive downlink information through the first cell, to reduce RRM measurement consumption. When the terminal device needs to establish an RRC connection, the terminal device may access the second cell to obtain a communication service, to meet a service requirement of the terminal device. A frequency of the first cell is different from a frequency of the second cell.

For S401: The terminal device camps on the first cell.

The first cell is a cell of a first access network device, and the terminal device is in an RRC idle state or an RRC inactive state. The terminal device may receive downlink information from the first access network device through the first cell. For example, the terminal device may receive multicast information, a paging message, and system information in the first cell.

In a possible implementation, the first cell does not support uplink transmission, or the first cell supports only multicast service transmission. When camping on the first cell, the terminal device receives only downlink information or receives only a multicast service, and does not perform RRM measurement, to implement power saving.

For S402: Determine to access the second cell in response to receiving a paging message from the first cell, in response to determining that there is to-be-transmitted uplink information, or in response to determining that there is a to-be-transmitted non-multicast service.

The second cell is a cell of a second access network device. The second access network device is different from the first access network device, or the second access network device and the first access network device are a same access device. The frequency of the first cell is the first frequency, and the frequency of the second cell is the second frequency. In other words, the frequency of the first cell is different from the frequency of the second cell. Optionally, the first frequency is a frequency point of the first cell, for example, a frequency point of an SSB of the first cell, and the second frequency is a frequency point of the second cell, for example, a frequency point of an SSB of the second cell. Alternatively, the first frequency is a frequency range. That the first frequency is different from the second frequency may be understood as that two frequency ranges are not completely the same, and the two frequency ranges may overlap. Optionally, the first cell and the second cell meet at least one of the following:

(1) the first frequency is lower than the second frequency;

(2) coverage of the first cell is greater than coverage of the second cell; and (3) a quantity of beams of the first cell is less than a quantity of beams of the second cell.

Specifically, for deployment of the first cell and the second cell, refer to an example in which the first access network device is a broadcast television transmitter tower (a large tower) and the second access network device is a common base station (a small tower) for description. It may be understood that the communication method provided in this embodiment of this application is also applicable to another network architecture including two access network devices. For example, the first access network device may be a cell deployed on a satellite, and a cell coverage area of the first access network device may reach hundreds of square kilometers or even thousands of square kilometers; the second access network device may be a regular cell, for example, a common macro cell or a micro cell. It may be understood that, in some scenarios, the first access network device and the second access network device may be a same access network device. When the first access network device and the second access network device are a same access network device, the same access network device may support the first frequency and the second frequency, where the first frequency corresponds to the first cell, and the second frequency corresponds to the second cell. To ensure larger coverage of the first cell, a plurality of first access network devices may send a same cell-specific reference signal at the first frequency in a single frequency network (single frequency network, SFN) manner, and cells corresponding to the plurality of first access network devices are combined into a larger cell corresponding to the first frequency. However, each first access network device sends a different cell-specific reference signal at the second frequency. In this way, reference signal coverage at the first frequency is far greater than reference signal coverage at the second frequency. The following uses only a large tower and a small tower as an example for description.

In a first possible implementation, the first frequency is lower than the second frequency, in other words, a transmit frequency of the large tower is lower than a transmit frequency of the small tower. When a transmit frequency is higher, an information transmission rate is higher. However, a high carrier frequency makes a radio signal transmitted at the carrier frequency experience more severe fading in a spatial propagation process, and it is even difficult to detect the radio signal at a receiving end. Therefore, a penetrability of a high-frequency signal is poor, a transmission distance of the high-frequency signal is short, and communication can be performed only in a place that is very close to a base station and that has few obstacles. However, a low-frequency signal may implement wider network coverage by using a small quantity of beams. Therefore, in the serving first cell of the large tower, overheads of performing RRM measurement and beam measurement by the terminal device can be reduced.

In a second possible implementation, the coverage of the first cell is greater than the coverage of the second cell, and the large tower can implement larger communication coverage by using a highly deployed antenna and/or a large signal transmit power. Because a radius of the first cell is large, a quantity of cell reselection times of the terminal device can be reduced, and overheads of performing cell measurement and receiving system information (system information, SI) by the terminal device can be further reduced.

In a third possible implementation, the quantity of beams of the first cell is less than the quantity of beams of the second cell, so that overheads of performing beam (beam) selection and monitoring a paging message by the terminal device can be reduced.

In this embodiment of this application, a first frequency layer corresponding to the first frequency may be understood as an energy-saving layer, and the first frequency layer includes at least one first cell. At the energy-saving layer, the terminal device may receive only a downlink transmission, or receive only a multicast service, or determine, through signal measurement, whether to perform uplink transmission. A transmission feature of the first frequency layer may also be understood as a transmission feature of the first cell, in other words, the first cell does not support uplink transmission, or the first cell supports only multicast service transmission. Specifically, the first access network device corresponding to the first frequency may be, for example, a large tower. At the first frequency layer at which the large tower provides a service, because a radius of coverage of the large tower is large, consumption of uplink transmission performed by the terminal device is large. Therefore, the terminal device may save energy by receiving only a downlink service or receiving only a multicast service, and leave the first frequency layer when uplink transmission needs to be performed or a non-multicast service needs to be received.

The transmission feature supported by the first frequency layer may be described by using the following several implementations as examples:

In a first possible implementation, the first cell corresponding to the first frequency layer does not support uplink transmission, in other words, the first cell supports only downlink transmission. The terminal device receives only downlink information from the first access network device at the first frequency layer. When the terminal device needs to perform uplink transmission, the terminal device may leave the first frequency layer. Further, the terminal device may obtain a service through another access network device, for example, perform uplink transmission through the second cell. Specifically, the first frequency may be deployed on a frequency band or a frequency that supports only downlink transmission (downlink only, DL only). For example, a network device may plan a first frequency set as a DL only frequency band, and the first frequency set includes at least one first frequency.

In a second possible implementation, the first cell corresponding to the first frequency layer supports uplink transmission, and the terminal device may establish a connection to the first access network device at the first frequency layer. The terminal device needs to determine whether to access the first cell, to avoid excessive consumption or poor transmission quality of uplink transmission when a radius of the first cell is large.

The transmission feature of the first frequency layer is described above. It may be understood that the first frequency layer includes at least one first cell. Therefore, the transmission feature of the first frequency layer described above may be understood as a transmission feature of the first cell. A method for determining, by the terminal device, whether to access the first cell is described below.

It should be noted that, in some embodiments of this application, "in response to" may be understood as a trigger condition. In other words, when receiving a paging message from the first cell, the terminal device is triggered to determine that a target access cell is the second cell; when there is to-be-transmitted uplink information, the terminal device is triggered to determine that a target access cell is the second cell; or when there is a to-be-transmitted non-multicast service, the terminal device is triggered to determine that the target access cell is the second cell. S402 may alternatively be understood as: When a first condition is met, the terminal device determines to access the second cell, where the first condition includes at least one of the following:

(1) receiving indication information from an access network device, where optionally, the indication information is carried in paging information;

(2) having to-be-transmitted uplink information; and (3) having a to-be-transmitted non-multicast service.

With reference to "leaving the first frequency layer" shown in FIG. 3, the first condition may be understood as a condition for triggering the terminal device to leave the first frequency layer. In response to meeting the first condition, the terminal device determines to leave the first cell, and further, the terminal device determines to access the second cell. Optionally, it may be understood that step S402 includes steps S4021 and S4022.

S4021: The terminal device determines that access needs to be performed.

S4022: The terminal device determines that the target access cell is the second cell, or the terminal device determines to access the first cell.

Specifically, a method for determining, by the terminal device, that access needs to be performed may be understood with reference to the following several implementations:

In a first possible implementation, the terminal device receives, in the first cell, first indication information from the first access network device, where the first indication information indicates the terminal device to perform access. Further, the terminal device further receives second indication information from the first access network device, where the second indication information indicates the terminal device to access the second cell. The first indication information and/or the second indication information may be carried in a paging message. The terminal device determines, based on the indication information in the paging message, whether to access the first cell. Specifically, the first indication information and/or the second indication information are/is from the access network device, and the second indication information indicates the terminal device to access the first cell, indicates the terminal device not to access the first cell, indicates the terminal device to access the second cell, indicates the terminal device to select a cell based on the second frequency for access, or indicates, to the terminal device, that a frequency priority of the first frequency is the lowest priority. By using the explicit indication information, the access network device may flexibly schedule, in real time based on network load, whether the terminal device can access the first cell, to improve reliability of a communication system. Specifically, for the second indication information, refer to the following three designs as examples for understanding:

In a first design, the second indication information indicates the terminal device to access the first cell, or indicates the terminal device not to access the first cell. For example, if the terminal device receives a paging message from the access network device, and the paging cell includes an indication indicating that access is allowed, the terminal device determines to access the first cell. For another example, if the terminal device receives a paging message from the access network device, and the paging cell includes a redirection indication and/or an identifier of the second cell, the terminal device determines to access the second cell. The second indication information may be a bit value or a bit state. Further, the second indication information may be a reserved bit in the paging message. Therefore, flexible scheduling can be implemented by consuming a small amount of signaling.

In a second design, the second indication information indicates the terminal device to select a cell based on the second frequency for access. For example, the terminal device receives the second indication information from the first access network device, where the second indication information includes a value of the second frequency. The terminal device may perform cell search or cell selection at a second frequency layer based on the second frequency, choose to access the second cell, and further initiate a service in the second cell. In this design, the network device may determine a suitable cell based on the network load, and explicitly indicate the terminal device to perform access, to improve network resource utilization.

In a third design, the second indication information indicates, to the terminal device, that the frequency priority of the first frequency is the lowest priority. For example, the terminal device receives the second indication information from the first access network device, where the second indication information indicates the frequency priority of the first frequency. The terminal device may adjust a priority of the first cell based on the frequency priority of the first frequency and a priority list. When the frequency priority of the first frequency is lower than a frequency priority of the second frequency, the terminal device may trigger cell measurement and/or cell reselection for the second frequency, and further reselect the second cell. The priority list is predefined or preconfigured. For another example, the second indication information indicates that the frequency priority of the first frequency is the lowest. In this case, the terminal device may directly trigger cell measurement and/or cell reselection for the second frequency. It should be noted that, in this embodiment of this application, when determining not to perform access at the first frequency, the terminal device may perform cell measurement, cell selection, or cell reselection based on a preconfigured or predefined candidate frequency. The candidate frequency may be the second frequency, and the second frequency is a frequency different from the first frequency. The terminal device may determine, based on the frequency priority, whether the first cell is suitable for access, and may determine at least one candidate frequency based on the priority list. Further, the terminal device determines, based on a real-time load state of the communication system, a suitable cell for access, to ensure transmission reliability of a subsequent service.

Correspondingly, when determining that the terminal device needs to perform access, the access network device may notify the terminal device by using the first indication information and/or the second indication information. Further, the access network device may determine, based on the network load state, whether the terminal device can access the first cell. For example, the access network device determines a current downlink transmission type. When a transmission volume of a downlink service meets a second threshold, the access network device determines that the terminal device can access the first cell. Otherwise, the access network device determines that the terminal device cannot access the first cell. The second threshold may be predefined. For another example, the access network device may further determine, based on an overall transmission volume of the first frequency layer, whether the terminal device can access the first cell. When the overall transmission volume of the first frequency layer meets a third threshold, the access network device determines that the terminal device can access the first cell. Otherwise, the access network device determines that the terminal device cannot access the first cell. The third threshold may be predefined. Optionally, the method further includes step S401: The access network device determines the second indication information, where the indication information indicates to access the second cell, indicates not to access the first cell, indicates to select a cell based on the second frequency for access, or indicates that the frequency priority of the first frequency is the lowest priority. Optionally, the method further includes step S402: The access network device sends the indication information to the terminal device through the first cell. Specifically, the first access network device may send the second indication information to the terminal device. For a meaning of the second indication information, refer to the foregoing related descriptions.

In a second possible implementation, the terminal device determines that there is to-be-transmitted uplink information, and further determines that access needs to be performed. Further, the terminal device may determine, based on the transmission feature of the first cell and/or a type of a to-be-transmitted service, whether to access the first cell. In this way, the terminal device determines, based on a real-time network load state, a suitable cell for access. Specifically, refer to the following three designs as examples for understanding:

In a first design, the first cell does not support uplink transmission, and when determining that there is to-be-transmitted uplink information, the terminal device determines to access the second cell. In other words, the first cell supports only downlink transmission, and the terminal device may receive only a downlink transmission in the first cell, but does not perform uplink transmission in the first cell. When the coverage of the first cell is large, uplink transmission consumption can be avoided, and power can be saved.

In a second design, the first cell supports uplink transmission, and the terminal device determines, through reference signal measurement, whether to access the first cell. In other words, the terminal device may determine, through reference signal measurement, whether to perform access based on the first frequency. For example, the terminal device measures a reference signal to obtain a reference signal received power (reference signal received power, RSRP) value. When determining that a measurement result is greater than a first threshold, the terminal device determines to access the first cell. When determining that the measurement result is less than the first threshold, the terminal device determines to access the second cell. The first threshold is predefined or preconfigured. In other words, when the terminal device is close to the first access network device, quality of the received reference signal may meet a requirement. Correspondingly, the terminal device may bear consumption of uplink transmission. Therefore, the terminal device determines to access the first cell. When determining that the RSRP value does not meet the first threshold, the terminal device determines not to access the first cell, or the terminal device determines to access the second cell, where the second cell is a cell of the second access network device. Through real-time reference signal measurement, the terminal device may determine to access a cell with minimum transmission consumption at a current location, or determine to access a cell with acceptable transmission consumption, without a need to be indicated by the network device. This can avoid a problem that the network device needs to perform frequent indication or an indicated access cell is not suitable because the terminal device moves, and further implement power saving while ensuring transmission quality.

In a third design, the first cell supports uplink transmission, and the terminal device determines, based on a type of a service that triggers access, whether to access the first cell. For example, when determining that uplink information that needs to be sent is signaling, the terminal device determines to access the first cell. Because an amount of content that needs to be transmitted by using signaling is usually small, and a quantity of occupied transmission resources is also small, sending can be quickly completed, and power consumption can be reduced. Therefore, the terminal device may perform uplink signaling transmission in the first cell. When determining that the uplink information that needs to be sent is a data service, the terminal device determines not to access the first cell. Further, the terminal device may determine, through cell reselection or cell selection, to access the second cell. In this design, an indication of the network device can be avoided, additional measurement consumption can be avoided, whether to access the first cell can be quickly determined, and communication efficiency can be improved.

In a third possible implementation, the terminal device determines that there is a to-be-transmitted non-multicast service, and further determines that access needs to be performed. Further, the terminal device may determine, based on the transmission feature of the first cell and/or a type of a to-be-transmitted service, whether to access the first cell. In this case, the first cell corresponding to the first frequency layer supports only non-multicast service transmission. Therefore, when the terminal device determines that there is a to-be-transmitted non-multicast service, access needs to be performed. For a method for determining, by the terminal device, whether to access the first cell, refer to related descriptions of the three designs in the second possible implementation. Details are not described herein again. A scenario in which the first cell corresponding to the first frequency layer supports only non-multicast service transmission is to be described in detail in Embodiment 2.

According to the communication method provided in this embodiment of this application, the network device may deploy the energy-saving layer, so that the terminal device receives only a low-power transmission in the first cell, to reduce power overheads; and accesses the second cell when high-power transmission needs to be performed, to save power of the terminal device. In addition, when the radius of the first cell is greater than a radius of the second cell, compared with the second cell, measurement consumption can be reduced when the terminal device moves in the first cell. Therefore, low consumption of the terminal device can be maintained in a large range, and consumption of the terminal device can be reduced.

Optionally, the method further includes S403: The terminal device accesses the second cell, and further, the terminal device performs service transmission in the second cell.

Optionally, the method further includes step S404: When a serving cell of the terminal device is a third cell, change the serving cell to the first cell through cell selection, cell reselection, or handover, where a frequency of the third cell is different from the first frequency.

The third cell may be understood as a cell at the second frequency layer, the third cell is different from the first cell, and the third cell may be the same as or different from the second cell. When the terminal device determines that the terminal device expects to save power overheads in a next period of time, the terminal device may leave the second frequency layer and enter the energy-saving layer (the first frequency layer). Herein, the second frequency layer should be understood as a cell set including cells other than those at the first frequency layer. The second frequency layer is not limited to one frequency, and may alternatively include a plurality of frequencies, including the second cell and the third cell. An example in which the serving cell of the terminal device is the third cell is used for description below. It should be noted that an execution sequence of step S404 is not limited in this embodiment of this application. In a possible implementation shown in FIG. 5, S404 is performed before S401.

With reference to "entering the first frequency layer" shown in FIG. 3, a condition for triggering the terminal device to enter the first frequency layer may be understood with reference to the following several implementations:

In a first possible implementation, the terminal device receives a first message from the access network device, where the first message indicates the frequency priority of the first frequency. For example, the first message indicates that the frequency priority of the first frequency is the highest priority, and the terminal device triggers cell reselection to the first frequency layer.

In a second possible implementation, the terminal device receives a first message from the access network device, where the first message indicates that the first frequency is a frequency in an energy-saving mode. After determining the frequency in the energy-saving mode, the terminal device may determine, with reference to the current service requirement and/or an energy-saving requirement, to switch the serving cell to the first cell, for example, the terminal device determines.

Optionally, the first message may be a broadcast message or a dedicated RRC message, and/or the second message may be a broadcast message or a dedicated RRC message. When the access network device needs to send energy-saving layer information to a plurality of terminal devices, the energy-saving layer information may be sent by using a broadcast message, to reduce signaling consumption. When the access network device needs to send specified energy-saving layer information to a terminal device, the energy-saving layer information may be sent by using dedicated signaling, to implement flexible configuration for the terminal device. Correspondingly, the access network device may indicate frequency priority information of the energy-saving layer to the terminal device. Optionally, the method further includes step S4041: The access network device sends the first message to the terminal device, where the first message indicates the frequency priority of the first frequency, or the first message indicates that the first frequency is a frequency in the energy-saving mode. In this way, the terminal device is dynamically scheduled to enter the energy-saving layer based on the network load state.

In a third possible implementation, the terminal device determines, based on an energy-saving requirement, to change the serving cell to the first cell. For example, if the terminal device is in an energy-saving mode, the terminal device may adjust the frequency priority of the first frequency corresponding to the energy-saving layer (the first frequency layer) to the highest priority, to trigger cell reselection for the first frequency layer.

In a fourth possible implementation, the terminal device determines, based on the service requirement, to change the serving cell to the first cell. For example, the terminal device determines to change the serving cell to the first cell when a service activity in first duration is lower than a specific threshold. The service activity may be understood as a service activity degree, for example, an interval between two services, and a longer interval indicates a lower service activity. For another example, the terminal device determines to change the serving cell to the first cell when a service requirement in the next first duration is lower than a specific threshold, where the service requirement includes an access delay requirement. When an access delay that the terminal device needs to meet is greater than a specific threshold, the terminal device may determine to change the serving cell to the first cell. For example, if the first cell may provide a communication service with an access delay of 3 to 5 milliseconds (ms), the threshold may be set to 5 ms. When the terminal device needs to meet an access delay of less than 10 ms, the serving cell may be changed to the first cell. Correspondingly, when the access delay that the terminal device needs to meet is less than the specific threshold, the terminal device needs to take a period of time to return from the energy-saving layer to the second frequency layer. Therefore, the terminal device may not camp on the energy-saving layer, to meet an access delay requirement. The first duration may be predefined, and the first duration may be a period of time or a time phase.

In a fifth possible implementation, the terminal device determines, based on power, to change the serving cell to the first cell. For example, when the terminal device determines that the current power is less than a second threshold, or when the terminal device is in a low power mode, the terminal device changes the serving cell to the first cell, to save power. The second threshold may be preset, or may be dynamically set by the terminal device.

In a possible scenario, the terminal device may determine, with reference to any two or all of the foregoing manners, to change the serving cell to the first cell.

The foregoing condition for triggering the terminal device to determine to change the serving cell to the first cell may be summarized as a second condition. When the second condition is met, the terminal device determines to change the serving cell to the first cell, where the second condition includes at least one of the following:

(1) receiving the first message from the access network device, where the first message indicates the frequency priority of the first frequency, or indicates that the first frequency is a frequency in the energy-saving mode;

(2) determining that the terminal device needs to save energy;

(3) determining that the service activity is low or the service requirement is low; and (4) determining that the power is less than the second threshold.

According to the communication method provided in this embodiment of this application, the terminal device can camp on the first frequency layer (the energy-saving layer) when the terminal device expects to save power overheads (for example, receive only a downlink transmission), and access the second frequency layer when high-power transmission is required (for example, uplink transmission is required), so that power is saved while the service requirement is met, and service duration is prolonged. In addition, the access network device may flexibly and dynamically schedule, by using a network message, the terminal device to enter or leave the first frequency layer. Alternatively, the terminal device may determine, based on the power-saving state and/or the service requirement of the terminal device, whether to access the first frequency layer, so that dynamic adjustment is performed with reference to the network load, and resource utilization and communication stability of the communication system are improved.

Further, the technical effects of this embodiment of this application are not limited to an energy-saving scenario. For example, in a network, the first frequency layer may be deployed to transmit only a multicast service, and the multicast service is sent by using a cell with a larger coverage area, so that transmission efficiency can be improved, and network deployment costs can be reduced. The following provides detailed descriptions by using Embodiment 2.

Embodiment 2

As shown in FIG. 6, an embodiment of this application provides a communication method, including steps S601 and S602.

S601: A terminal device camps on a first cell.

S602: Determine to access a second cell in response to receiving a paging message from the first cell or in response to determining that there is a to-be-transmitted non-multicast service.

A frequency of the first cell is a first frequency, and a frequency of the second cell is a second frequency. In this embodiment, for definitions of the first cell, the second cell, the first frequency, the second frequency, a first access network device, and a second access network device, refer to related descriptions in Embodiment 1. Details are not described herein again.

According to the communication method provided in this embodiment of this application, the terminal device may camp on the first cell when the terminal device is in an idle state and receive a multicast service through the first cell, to reduce RRM measurement consumption. When the terminal device needs to receive a non-multicast service or needs to perform uplink transmission, the terminal device may access the second cell to obtain a communication service. The frequency of the first cell is different from the frequency of the second cell.

The second cell is a cell of the second access network device. The second access network device is different from the first access network device. The frequency of the first cell is the first frequency, and the frequency of the second cell is the second frequency. In other words, the frequency of the first cell is different from the frequency of the second cell. Optionally, the first cell and the second cell meet at least one of the following:

(1) the first frequency is lower than the second frequency;

(2) coverage of the first cell is greater than coverage of the second cell; and (3) a quantity of beams of the first cell is less than a quantity of beams of the second cell.

For specific meanings of transmission features of the first cell and the second cell, refer to related descriptions in step S402. Details are not described herein again. It may be understood that the first cell is deployed at a low frequency and/or with wide coverage, and an access network device may implement wide-coverage multicast transmission by deploying a small quantity of base stations, so that costs of network architecture deployment are reduced, and transmission efficiency of the multicast service is improved.

For a transmission feature supported by the first cell corresponding to a first frequency layer, refer to related descriptions in step S402. Details are not described herein again.

For Embodiment 2, the terminal device may access the second cell when a first condition is met, where the first condition includes at least one of the following:

(1) receiving indication information from the access network device, where optionally, the indication information is carried in paging information; and (2) having a to-be-transmitted non-multicast service.

Optionally, it may be understood that step S602 includes steps S6021 and S6022.

S6021: The terminal device determines that access needs to be performed.

S6022: The terminal device determines that a target access cell is the second cell, or the terminal device determines to access the first cell.

Specifically, a method for determining, by the terminal device, that access needs to be performed may be understood with reference to the following several implementations:

In a first possible implementation, the terminal device receives, in the first cell, first indication information from the first access network device, where the first indication information indicates the terminal device to perform access. Further, the terminal device further receives second indication information from the first access network device, where the second indication information indicates the terminal device to access the second cell. The first indication information and/or the second indication information may be carried in a paging message. The terminal device determines, based on the indication information in the paging message, whether to access the first cell. Specifically, the first indication information and/or the second indication information are/is from the access network device, and the second indication information indicates the terminal device to access the first cell, indicates the terminal device not to access the first cell, indicates the terminal device to access the second cell, indicates the terminal device to select a cell based on the second frequency for access, or indicates, to the terminal device, that a frequency priority of the first frequency is the lowest priority. By using the explicit indication information, the access network device may flexibly schedule, in real time based on network load, whether the terminal device can access the first cell, to improve reliability of a communication system. Specifically, for the second indication information, refer to related descriptions in step S402. Details are not described herein again. Correspondingly, when determining that the terminal device needs to perform access, the access network device may notify the terminal device by using the first indication information and/or the second indication information.

In a second possible implementation, the terminal device determines that there is a to-be-transmitted non-multicast service, and further determines that access needs to be performed. Further, the terminal device may determine, based on the transmission feature of the first cell and/or a type of a to-be-transmitted service, whether to access the first cell.

Optionally, the first cell does not support uplink transmission, and when determining that there is a to-be-transmitted non-multicast service, the terminal device determines to access the second cell. In other words, the first cell supports only multicast service transmission, and the terminal device may receive only a multicast service in the first cell, but does not perform uplink transmission in the first cell. When the coverage of the first cell is large, uplink transmission consumption can be avoided, and power can be saved.

Optionally, the method further includes S603: The terminal device accesses the second cell, and further, the terminal device performs service transmission in the second cell.

Optionally, the method further includes step S604: When a serving cell of the terminal device is a third cell, change the serving cell to the first cell through cell selection, cell reselection, or handover, where a frequency of the third cell is different from the first frequency.

The third cell may be understood as a cell at a second frequency layer, the third cell is different from the first cell, and the third cell may be the same as or different from the second cell. When the terminal device operates at the second frequency layer, if it is determined that the terminal device needs to receive only a multicast service in a next period of time, and there is no other service requirement, the terminal device may leave the second frequency layer and enter an energy-saving layer (the first frequency layer). Herein, the second frequency layer should be understood as a cell set including cells other than those at the first frequency layer, including the second cell and the third cell. Specifically, for a method for triggering, by the terminal device, the terminal device to enter the first frequency layer, refer to related descriptions in step S404. Details are not described herein again. It should be noted that an execution sequence of step S604 is not limited in this embodiment of this application. In a possible implementation shown in FIG. 7, S604 is performed before S601.

According to the communication method provided in this embodiment of this application, based on implementation of power saving in Embodiment 1, the first frequency layer may be configured to transmit only a multicast service, to further improve transmission efficiency of the multicast service. A network device may provide a broadcast/multicast service for a large quantity of terminal devices through only the first access network device, and does not need to send the service through a plurality of access network devices, so that resource utilization of the communication system is improved.

Embodiment 3

Figures 13, 14A:
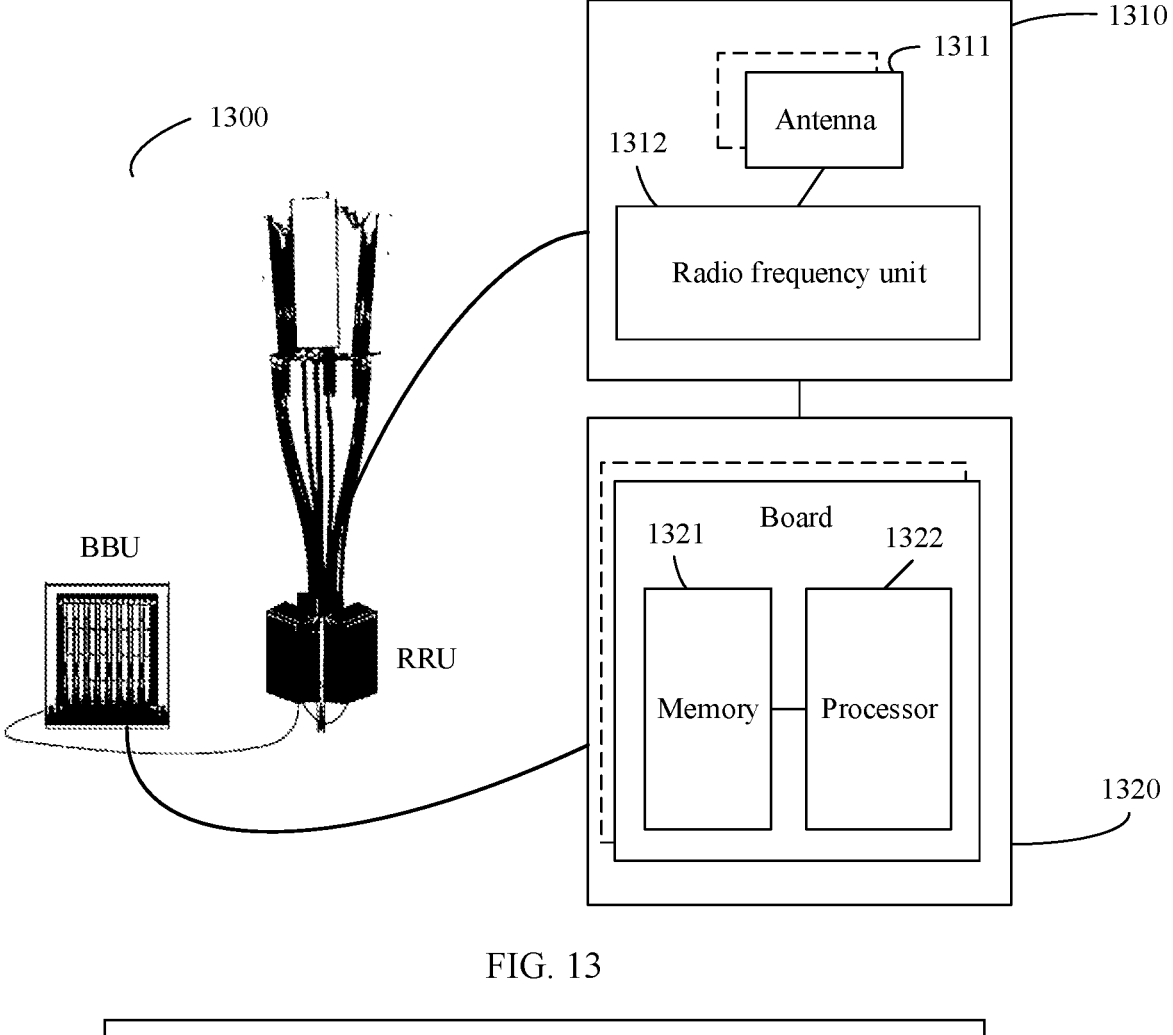
FIG. 13 is yet another schematic block diagram of a communication apparatus according to an embodiment of this application.
FIG. 14A is a flowchart of a third communication method according to an embodiment of this application.

As shown in FIG. 14A, an embodiment of this application provides a communication method, including steps S1401 to S1403.

S1401: A terminal device camps on a first frequency.

S1402: The terminal device receives, at the first frequency, access information corresponding to a second frequency.

S1403: The terminal device accesses the second frequency based on the access information.

For S1401: The terminal device camps on the first frequency.

The terminal device may receive downlink information at the first frequency. For example, the terminal device may receive multicast information, a paging message, system information, and random access response information at the first frequency.

In a possible implementation, the UE camps on a first cell at the first frequency, and the first cell does not support uplink transmission, or the first cell supports only multicast service transmission. For example, when the terminal device is in an RRC idle state or an RRC inactive state, the terminal device receives only downlink information or receives only a multicast service at the first frequency, and does not perform RRM measurement or reduce RRM measurement, to implement power saving.

For S1402: The terminal device receives, at the first frequency, the access information corresponding to the second frequency.

The access information is configuration information required when the terminal device accesses the second frequency.

For S1403: The terminal device accesses the second frequency based on the access information.

Optionally, before step S1402 or S1403, in response to receiving a paging message from the first cell of the first frequency, in response to determining that there is to-be-transmitted uplink information, or in response to determining that there is a to-be-transmitted non-multicast service, the terminal device determines that uplink access needs to be initiated.

In this embodiment, for definitions of the first cell, a second cell, the first frequency, the second frequency, a first access network device, and a second access network device, refer to related descriptions in Embodiment 1. It should be understood that the first frequency corresponds to the first cell, the second frequency corresponds to the second cell, camping on the first frequency may be understood as camping on the first cell, and accessing the second frequency may be understood as accessing the second cell. The first cell and the second cell may belong to a same access network device, and an existence form of the first cell and the second cell is not limited in this application. The first cell and the second cell may have a same physical cell identifier (PCI), and are distinguished and named only for ease of description.

According to the communication method provided in this embodiment of this application, the terminal device may camp on the first frequency when the terminal device is in the RRC idle state and receive the downlink information at the first frequency, to reduce RRM measurement consumption. When the terminal device needs to perform service transmission, the terminal device may access the second frequency to obtain a communication service, to meet a service requirement of the terminal device. The first frequency is different from the second frequency. The access information corresponding to the second frequency is received at the first frequency, so that overheads of receiving a broadcast message in the second cell and performing cell selection or cell reselection measurement can be reduced. Therefore, access efficiency is improved, and consumption is reduced.

Figure 14B:
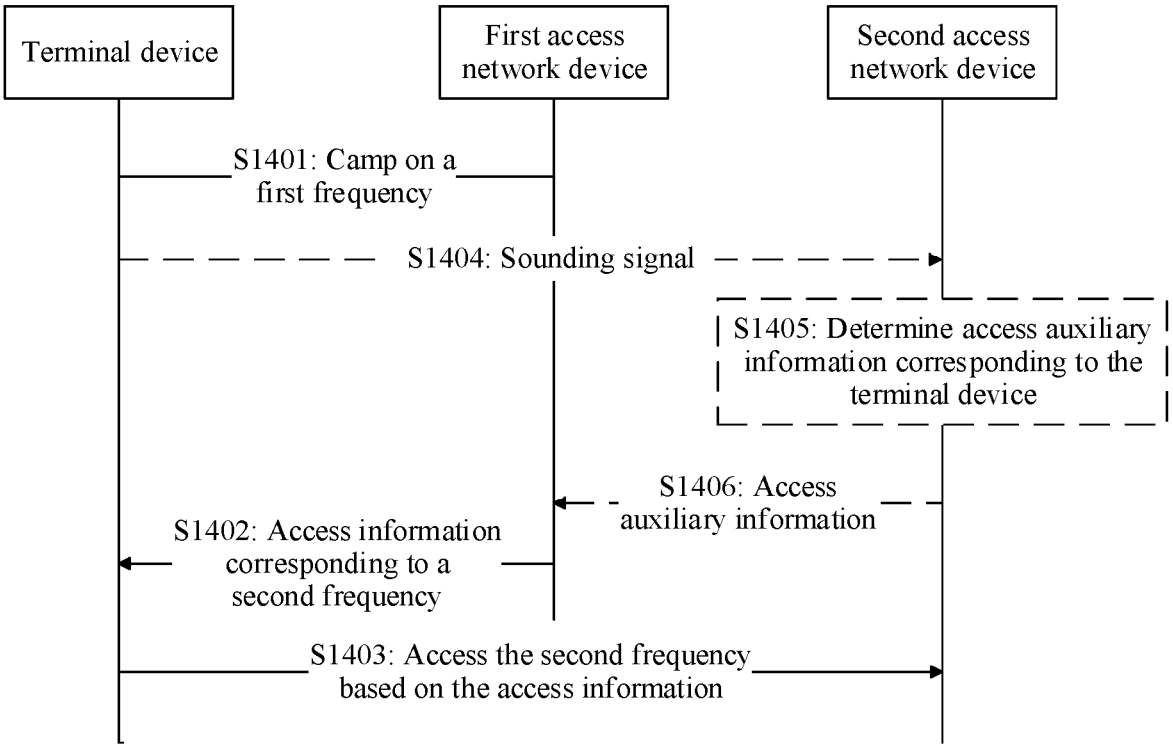
FIG. 14B is another flowchart of the third communication method according to this embodiment of this application.

Specifically, as shown in FIG. 14B, a process in which an access network device sends the access information to the terminal device may further include steps S1404 to S1407. It should be noted that steps S1404 to S1407 are all optional steps.

S1404: The terminal device sends a sounding signal to the second access network device. Correspondingly, the second access network device receives the sounding signal from the terminal device.

S1405: The second access network device determines access assistance information corresponding to the terminal device.

S1406: The second access network device sends the access assistance information to the first access network device. It should be understood that when the first access network device and the second access network device are a same device, step S1406 does not need to be performed.

S1407: The first access network device sends the access information corresponding to the second frequency to the terminal device.

For step S1404: The terminal device sends the sounding signal to the second access network device. Correspondingly, the second access network device receives the sounding signal from the terminal device.

The sounding signal is a specific code sequence or a reference signal. Optionally, the sounding signal is a random access channel (RACH) preamble sequence, and a sounding resource is a RACH resource. Correspondingly, the second access network device receives the sounding signal from the terminal device, and determines, based on the sounding signal, the access assistance information, of the terminal device, corresponding to the second frequency. For example, after receiving the reference signal from the terminal device, the second access network device may determine a location of the terminal device, to determine access information required for establishing a connection between the terminal device and the second access network device. In a possible implementation, a same sounding resource set may be configured for a plurality of second access network devices, where the sounding resource set includes at least one group of sounding resources, and the sounding resources include at least one of a sounding code sequence, a reference signal, and a frequency resource of the reference signal. The sounding resource set may be preconfigured in the terminal device, or may be sent by the access network device to the terminal device at the first frequency or the second frequency. The terminal device determines a sounding signal based on the sounding resource set, and sends the sounding signal to the second access network device at a third frequency, where the third frequency is an uplink frequency at which the terminal device communicates with the second cell, and configuration information of the third frequency may be received through the first cell. Therefore, when camping on the first cell in an energy-saving state, the terminal device may receive the configuration information of the third frequency through the first cell, and directly send uplink information to the second access network device at the third frequency. In this way, energy and delay consumption of obtaining, from the second cell, configuration information and access information of a cell deployed at the third frequency are reduced.

For step S1405: The second access network device determines the access assistance information corresponding to the terminal device.

The access assistance information is used by the terminal device to access the second frequency. The access assistance information includes configuration information of at least one second cell, the second cell is an access cell corresponding to the second frequency, and the configuration information of the second cell includes at least one of the following:

(1) identification information of the second cell, for example, a PCI or a cell identifier CI);

(2) frequency point information of the second frequency, for example, a frequency number of the second frequency;

(3) reference signal configuration information of the second cell, for example, SSB configuration information, CSI-RS configuration information, or discovery reference signal (DRS) configuration information;

(4) access resource information of the second cell, for example, configuration information of a RACH resource or message 3 (Msg3) grant information;

(5) system information of the second cell, for example, a system information block (SIB) 1 or a SIB 2; and (6) a measurement result of the sounding signal.

For step S1407: The first access network device determines the access information corresponding to the second frequency.

Specifically, after receiving the access assistance information, the first access network device determines, based on the access assistance information, the access information corresponding to the second frequency. The access information includes configuration information of one or more second cells in the access assistance information. The first access network device may also receive access assistance information from a plurality of second access network devices.

When the access assistance information received by the first access network device includes only one piece of second cell configuration information, the first access network device may send the second cell configuration information to the UE.

When the access assistance information includes a plurality of pieces of second cell configuration information, the first access network device may select one or more pieces of second cell configuration information from the plurality of pieces of second cell configuration information as the access information, or send the entire access assistance information to the terminal device as the access information.

In a possible implementation, the first access network device determines the access information based on at least one measurement result and the access assistance information. The at least one measurement result is a measurement result determined by at least one second cell based on the received sounding signal. In other words, the measurement result may represent quality of the received sounding signal in the corresponding second cell. For example, the measurement result includes an RSRP value or a reference signal received quality (RSRQ) value. For example, the first access network device selects, based on the measurement result, one or more second cells with highest quality of the received sounding signal. For another example, the first access network device selects, based on a predefined threshold, at least one second cell whose measurement result is higher than the threshold, and sends configuration information of the at least one second cell to the terminal device. Optionally, the access information corresponding to the second frequency is carried in a random access response message, system broadcast information, or a sounding response message. The access information corresponding to the second frequency may be sent by using different messages. For example, a cell ID may be carried in a sounding response message, and a RACH configuration may be sent by using system broadcast information. In a possible implementation, the first access network device transmits an acknowledgment mark of the sounding signal to the terminal device by using sounding response information. After receiving the acknowledgment mark, the terminal device may determine that the sounding response information is in response to the sounding signal.

After determining the access information corresponding to the second frequency, the first access network device sends the access information to the terminal device at the first frequency. Correspondingly, the terminal device receives, at the first frequency, the access information corresponding to the second frequency, and accesses the second frequency based on the access information. The following describes in detail a method in which the terminal device performs access based on the access information.

In a possible implementation, the access information includes the identification information of the second cell, and the terminal device determines an identifier of an access cell based on the identification information. Optionally, the access information does not include RACH configuration information, and after obtaining cell timing based on an SSB or a CSI-RS, the terminal device may read a SIB 1 to obtain random access configuration information, and then perform random access based on the random access configuration information. Further, optionally, the access information includes scheduling configuration information of the SIB 1, and the terminal may determine scheduling of the SIB 1 based on the scheduling configuration information of the SIB 1 in the access resource information, and receive the SIB 1 according to the scheduling.

In another possible implementation, the access information includes configuration information of a random access resource and an ID of the second cell, and the terminal device initiates random access to the second cell based on the ID of the second cell and the configuration information of the random access resource, where a frequency of the second cell is the second frequency. The configuration information of the random access resource may include at least one of an access occasion configuration, a frequency configuration, and a preamble configuration of the random access resource.

In still another possible implementation, the access information includes grant information of a Msg3 of the second cell. The terminal device may send the Msg3 to a base station based on the grant information of the Msg3, without a need to initiate a complete random access procedure in the second cell, so that communication efficiency is improved. The Msg3 may include an RRC establishment request, an RRC re-establishment request, or RRC resume request information of the terminal device. The Msg3 may further include a first beam identifier determined by the terminal device through measurement. The first beam identifier indicates a beam that the terminal device requests to access, and may also be understood as a preferred beam direction determined by the terminal device. The second access network device may determine, based on the first beam identifier, the preferred beam direction of the terminal device. Further, the second access network device may schedule the terminal device based on the preferred beam direction.

In a possible implementation, the access information includes the frequency point information of the second frequency, and the terminal device performs access based on the frequency point information. It should be noted that when the configuration information of the second cell does not include the frequency point information of the second frequency, the terminal device may determine the frequency information of the second frequency by using a broadcast message of the first cell, or the frequency point information of the second frequency may be preconfigured in the terminal device. When the access information includes the frequency point information of the second frequency, the terminal device may use the frequency point information for access, to reduce delay and energy consumption of receiving a broadcast message.

In a possible implementation, the access information includes the reference signal configuration information of the second cell, and the terminal device may perform reference signal measurement based on the reference signal configuration information. When the access information includes the SSB configuration information, the terminal device may perform SSB measurement and cell synchronization based on window configuration information of an SSB. After completing downlink synchronization, the terminal device may initiate access based on the random access resource. When the access information includes the CSI-RS configuration information, after obtaining the cell timing (a frame boundary or a slot boundary) based on the SSB, the terminal device may perform CSI-RS measurement based on the cell timing. For another example, the terminal device may determine downlink timing (a frame boundary or a slot boundary) of the cell based on a location for sending a CSI-RS, and then initiate access based on the random access resource. The terminal device may further determine, based on an SSB measurement result or a CSI-RS measurement result, the first beam identifier carried in the Msg3. It should be noted that, when the configuration information of the second cell does not include the reference signal configuration information of the second cell, the terminal device may receive the SSB by blindly detecting an SSB reference signal corresponding to the cell identifier.

In a possible implementation, the access information includes configuration information of a plurality of second cells, and the terminal device measures reference signals of the plurality of second cells. When finding a downlink reference signal of only one cell, the terminal device determines to perform access by using an access parameter of the found cell. When finding a plurality of cells, the terminal device may select an access parameter of one cell for access. Specifically, the terminal device may perform selection based on measurement results of the plurality of cells, and may select a cell with high measurement quality for the terminal device, to improve communication quality of the terminal device and reduce consumption of cell measurement performed by the terminal device.

It should be noted that the foregoing possible implementations may be applied in combination with each other.

According to the communication method provided in this embodiment of this application, the terminal device may camp on the first frequency when the terminal device is in the RRC idle state and receive the downlink information at the first frequency, to reduce the RRM measurement consumption. When the terminal device needs to perform service transmission, the terminal device may send the sounding signal to the second access network device. The second access network device may determine the location of the terminal device by receiving the sounding signal from the terminal device, and further determines that the second access network device can provide a service for the terminal device. The second access network device may send, to the terminal device at the first frequency (through the first access network device), the access assistance information used by the terminal device for access. The terminal device accesses the second frequency to obtain the communication service, to meet the service requirement of the terminal device. The access information corresponding to the second frequency is received at the first frequency, so that the overheads of receiving the broadcast message in the second cell and performing cell selection or cell reselection measurement can be reduced. Therefore, the access efficiency is improved, and the consumption is reduced.

With reference to the accompanying drawings, the following describes apparatuses configured to implement the foregoing methods in embodiments of this application. Therefore, all the foregoing content may be used in the following embodiments. Repeated content is not described again.

Figures 7, 8, 9:
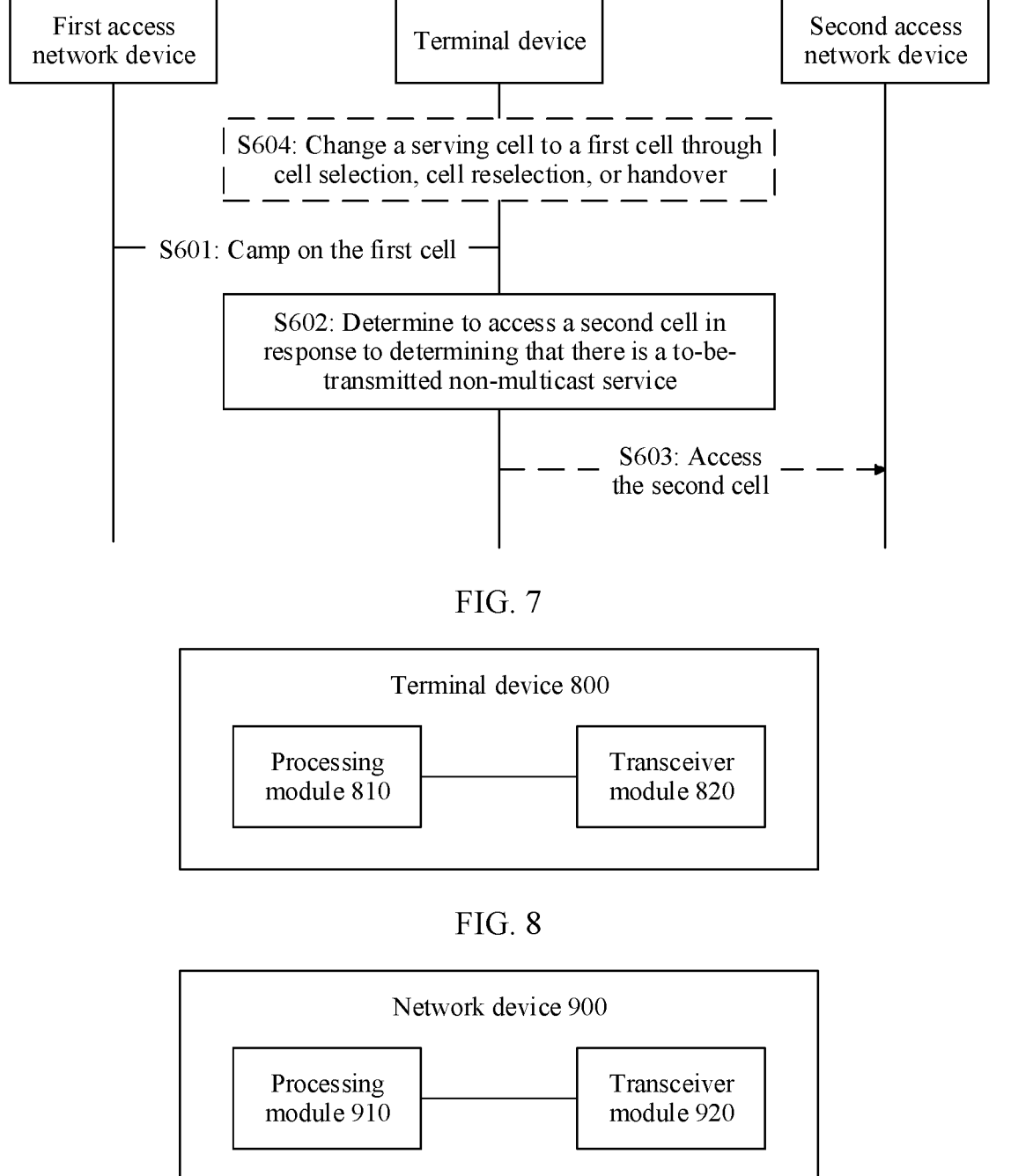
FIG. 7 is another flowchart of the second communication method according to this embodiment of this application.
FIG. 8 is a schematic block diagram of a first terminal device according to an embodiment of this application.
FIG. 9 is a schematic block diagram of a first network device according to an embodiment of this application.

FIG. 8 is a schematic block diagram of a communication apparatus 800 according to an embodiment of this application. For example, the communication apparatus 800 is a terminal device 800.

The terminal device 800 includes a processing module 810 and a transceiver module 820. For example, the terminal device 800 may be a terminal device, or may be a chip used in the terminal device or another combined device or a component that has a function of the terminal device. When the terminal device 800 is a terminal device, the transceiver module 820 may be a transceiver. The transceiver may include an antenna, a radio frequency circuit, and the like. The processing module 810 may be a processor, for example, a baseband processor. The baseband processor may include one or more CPUs. When the terminal device 800 is a component that has the function of the terminal device, the transceiver module 820 may be a radio frequency unit, and the processing module 810 may be a processor, for example, a baseband processor. When the terminal device 800 is a chip system, the transceiver module 820 may be an input/output interface of a chip (for example, a baseband chip), and the processing module 810 may be a processor of the chip system, and may include one or more central processing units. It should be understood that, in this embodiment of this application, the processing module 810 may be implemented by using a processor or a processor-related circuit component, and the transceiver module 820 may be implemented by using a transceiver or a transceiver-related circuit component.

For example, the processing module 810 may be configured to perform all operations, such as S402, that are performed by the terminal device in the embodiment shown in FIG. 4 and FIG. 5, FIG. 6 and FIG. 7, or FIG. 14A and FIG. 14B other than receiving and sending operations, and/or configured to support another process of the technology described in this specification. The transceiver module 820 may be configured to perform all receiving and sending operations, such as S401 and S403, that are performed by the terminal device in the embodiment shown in FIG. 4 and FIG. 5, FIG. 6 and FIG. 7, or FIG. 14A and FIG. 14B, and/or configured to support another process of the technology described in this specification.

In addition, for an implementation of the transceiver module 820, refer to descriptions of the implementation of the transceiver module 820.

The transceiver module 820 is configured to communicate with another communication apparatus.

The processing module 810 is configured to enable, through the transceiver module 820, the communication apparatus to camp on a first cell.

The processing module 810 is further configured to determine to access a second cell in response to receiving a paging message from the first cell, in response to determining that there is to-be-transmitted uplink information, or in response to determining that there is a to-be-transmitted non-multicast service. A frequency of the first cell is a first frequency, and a frequency of the second cell is a second frequency.

In an optional implementation, the first cell and the second cell meet at least one of the following:

the first frequency is lower than the second frequency;

coverage of the first cell is greater than coverage of the second cell; and a quantity of beams of the first cell is less than a quantity of beams of the second cell.

In an optional implementation, the first cell does not support uplink transmission, or the first cell supports only multicast service transmission.

In an optional implementation, the processing module 810 is configured to determine, in the following manner, to access the second cell:

determining to access the second cell in response to determining that there is to-be-transmitted uplink information and determining that the first cell does not support uplink transmission; or determining to access the second cell in response to determining that there is to-be-transmitted uplink information and determining that the to-be-transmitted uplink information is a data service; or determining to access the second cell in response to determining that there is a to-be-transmitted non-multicast service and determining that the first cell supports only multicast service transmission.

In an optional implementation, the processing module 810 is configured to determine, in the following manner, to access the second cell: measuring a reference signal of the first cell; and determining to access the second cell when a measurement result is less than a first threshold.

In an optional implementation, the transceiver module 820 is further configured to receive indication information from a network device, where the indication information indicates to access the second cell, indicates not to access the first cell, indicates to select a cell based on the second frequency for access, or indicates that a frequency priority of the first frequency is the lowest priority.

In an optional implementation, the processing module 810 is configured to: perform cell selection based on the second frequency, and choose to access the second cell; or lower the frequency priority of the first frequency to a frequency priority lower than that of the second frequency, trigger measurement on a cell whose frequency is the second frequency, and reselect the second cell.

In an optional implementation, when a serving cell of the terminal device is a third cell, the processing module 810 is configured to change the serving cell to the first cell through cell selection, cell reselection, or handover, where a frequency of the third cell is different from the first frequency.

In an optional implementation, the transceiver module 820 is configured to receive a first message from the network device, where the first message indicates the frequency priority of the first frequency, or the first message indicates that the first frequency is a frequency in an energy-saving mode. The transceiver module 820 is further configured to: measure the first frequency, and change the serving cell to the first cell.

In an optional implementation, the first message is a broadcast message or a dedicated radio resource control RRC message.

In an optional implementation, the processing module 810 is configured to determine, based on at least one of an energy-saving mode of the terminal device, a service activity degree of the terminal device, power of the terminal device, and an access delay of the terminal device, to change the serving cell to the first cell.

In an optional implementation, the terminal device 800 is configured to implement the method corresponding to the terminal device in the embodiment shown in FIG. 14A and FIG. 14B. The transceiver module 820 is further configured to receive access information corresponding to a second frequency at a first frequency, and the processing module 810 is further configured to access the second frequency based on the access information through the transceiver module 820.

For another function that can be implemented by the terminal device 800, refer to related descriptions of the embodiment shown in FIG. 4 and FIG. 5, FIG. 6 and FIG. 7, or FIG. 14A and FIG. 14B. Details are not described again.

FIG. 9 is a schematic block diagram of a communication apparatus 900 according to an embodiment of this application. For example, the communication apparatus 900 is a network device 900.

The network device 900 includes a processing module 910 and a transceiver module 920. For example, the network device 900 may be a network device, or may be a chip used in the network device or another combined device or a component that has a function of the network device. When the network device 900 is a network device, the transceiver module 920 may be a transceiver. The transceiver may include an antenna, a radio frequency circuit, and the like. The processing module 910 may be a processor, for example, a baseband processor. The baseband processor may include one or more CPUs. When the network device 900 is a component that has the function of the network device, the transceiver module 920 may be a radio frequency unit, and the processing module 910 may be a processor, for example, a baseband processor. When the network device 900 is a chip system, the transceiver module 920 may be an input/output interface of a chip (for example, a baseband chip), and the processing module 910 may be a processor of the chip system, and may include one or more central processing units. It should be understood that in this embodiment of this application, the processing module 910 may be implemented by using a processor or a processor-related circuit component, and the transceiver module 920 may be implemented by using a transceiver or a transceiver-related circuit component.

For example, the processing module 910 may be configured to perform all operations that are performed by the access network device in the embodiment shown in FIG. 4 and FIG. 5, FIG. 6 and FIG. 7, or FIG. 14A and FIG. 14B other than receiving and sending operations, and/or configured to support another process of the technology described in this specification. The transceiver module 920 may be configured to perform all receiving and sending operations that are performed by the network device (the access network device) in the embodiment shown in FIG. 4 and FIG. 5, FIG. 6 and FIG. 7, or FIG. 14A and FIG. 14B, and/or configured to support another process of the technology described in this specification.

In addition, for an implementation of the transceiver module 920, refer to descriptions of the implementation of the transceiver module 820.

The processing module 910 is configured to determine indication information, where the indication information indicates to access a second cell, indicates not to access a first cell, indicates to select a cell based on a second frequency for access, or indicates that a frequency priority of a first frequency is the lowest priority.

The transceiver module 920 is configured to send the indication information to a terminal device through the first cell. A frequency of the first cell is the first frequency, a frequency of the second cell is the second frequency, the first cell is a cell of a first access network device, and the second cell is a cell of a second access network device.

In an optional implementation, the first cell and the second cell meet at least one of the following:

the first frequency is lower than the second frequency;

coverage of the first cell is greater than coverage of the second cell; and a quantity of beams of the first cell is less than a quantity of beams of the second cell.

In an optional implementation, the first cell does not support uplink transmission, or the first cell supports only multicast service transmission.

In an optional implementation, the indication information is carried in a paging message.

In an optional implementation, the transceiver module 920 is configured to send a first message to the terminal device, where the first message indicates the frequency priority of the first frequency, or the first message indicates that the first frequency is a frequency in an energy-saving mode.

In an optional implementation, the first message is a broadcast message or a dedicated radio resource control RRC message.

In an optional implementation, the network device 900 is configured to implement the method corresponding to the second access network device in the embodiment shown in FIG. 14A and FIG. 14B. The transceiver module 920 is configured to receive a sounding signal from a terminal device, the processing module 910 is configured to determine access assistance information corresponding to the terminal device, and the transceiver module 920 is further configured to send the access assistance information to a first access network device.

In an optional implementation, the network device 900 is configured to implement the method corresponding to the first access network device in the embodiment shown in FIG. 14A and FIG. 14B. The transceiver module 920 is configured to receive access assistance information from a second access network device, where the access assistance information is used by a terminal device to access a second frequency. The processing module 910 is configured to determine access information based on the access assistance information, and the transceiver module 920 is further configured to send the access information to the terminal device at a first frequency.

For another function that can be implemented by the network device 900, refer to related descriptions of the embodiment shown in FIG. 4 and FIG. 5, FIG. 6 and FIG. 7, or FIG. 14A and FIG. 14B. Details are not described again.

Figure 10:
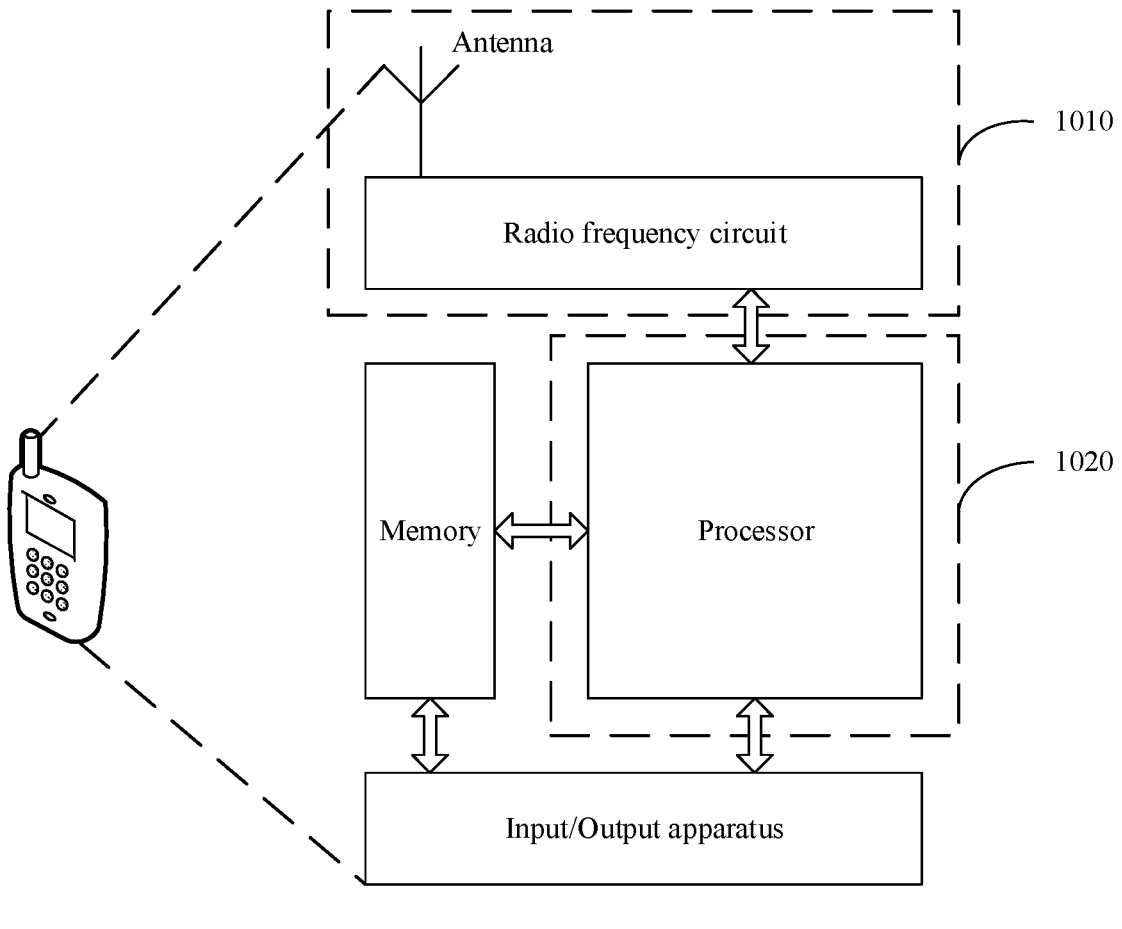
FIG. 10 is a schematic block diagram of a communication apparatus according to an embodiment of this application.

When the communication apparatus is a terminal device, FIG. 10 is a simplified schematic diagram of a structure of the terminal device. For ease of understanding and convenience of figure illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 10. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device (where the transceiver unit may be one functional unit, and the functional unit can implement a sending function and a receiving function; or the transceiver unit may include two functional units: a receiving unit that can implement a receiving function and a sending unit that can implement a sending function), and the processor that has a processing function may be considered as a processing unit of the terminal device. As shown in FIG. 10, the terminal device includes a transceiver unit 1010 and a processing unit 1020. The transceiver unit may also be referred to as a transceiver, a transceiver machine, a transceiver apparatus, or the like. The processing unit may also be referred to as a processor, a processing board, a processing module, a processing apparatus, or the like. Optionally, a component configured to implement a receiving function in the transceiver unit 1010 may be considered as a receiving unit, and a component configured to implement a sending function in the transceiver unit 1010 may be considered as a sending unit. That is, the transceiver unit 1010 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitting circuit, or the like.

It should be understood that the transceiver unit 1010 is configured to perform a sending operation and a receiving operation on a terminal device side in the foregoing method embodiments, and the processing unit 1020 is configured to perform another operation other than the receiving operation and the sending operation of the terminal device in the foregoing method embodiments.

For example, in an implementation, the processing unit 1020 may be configured to perform all operations, for example, an operation of determining to access a second cell, that are performed by the terminal device in the embodiment shown in FIG. 4 and FIG. 5 other than receiving and sending operations, and/or configured to support another process of the technology described in this specification. The transceiver unit 1010 may be configured to perform all receiving and sending operations, for example, an operation of camping on a first cell, that are performed by the terminal device in the embodiment shown in FIG. 4 and FIG. 5, and/or configured to support another process of the technology described in this specification.

For another example, in an implementation, the processing unit 1020 may be configured to perform all operations, for example, an operation of determining to access a second cell, that are performed by the terminal device in the embodiment shown in FIG. 6 and FIG. 7 other than receiving and sending operations, and/or configured to support another process of the technology described in this specification. The transceiver unit 1010 may be configured to perform all receiving and sending operations, for example, an operation of camping on a first cell, that are performed by the terminal device in the embodiment shown in FIG. 6 and FIG. 7, and/or configured to support another process of the technology described in this specification.

For still another example, in an implementation, the processing unit 1020 may be configured to perform all operations, for example, an operation of accessing a second frequency based on access information, that are performed by the terminal device in the embodiment shown in FIG. 14A and FIG. 14B other than receiving and sending operations, and/or configured to support another process of the technology described in this specification. The transceiver unit 1010 may be configured to perform all receiving and sending operations, for example, an operation of receiving the access information corresponding to the second frequency at a first frequency, that are performed by the terminal device in the embodiment shown in FIG. 14A and FIG. 14B, and/or configured to support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 11:
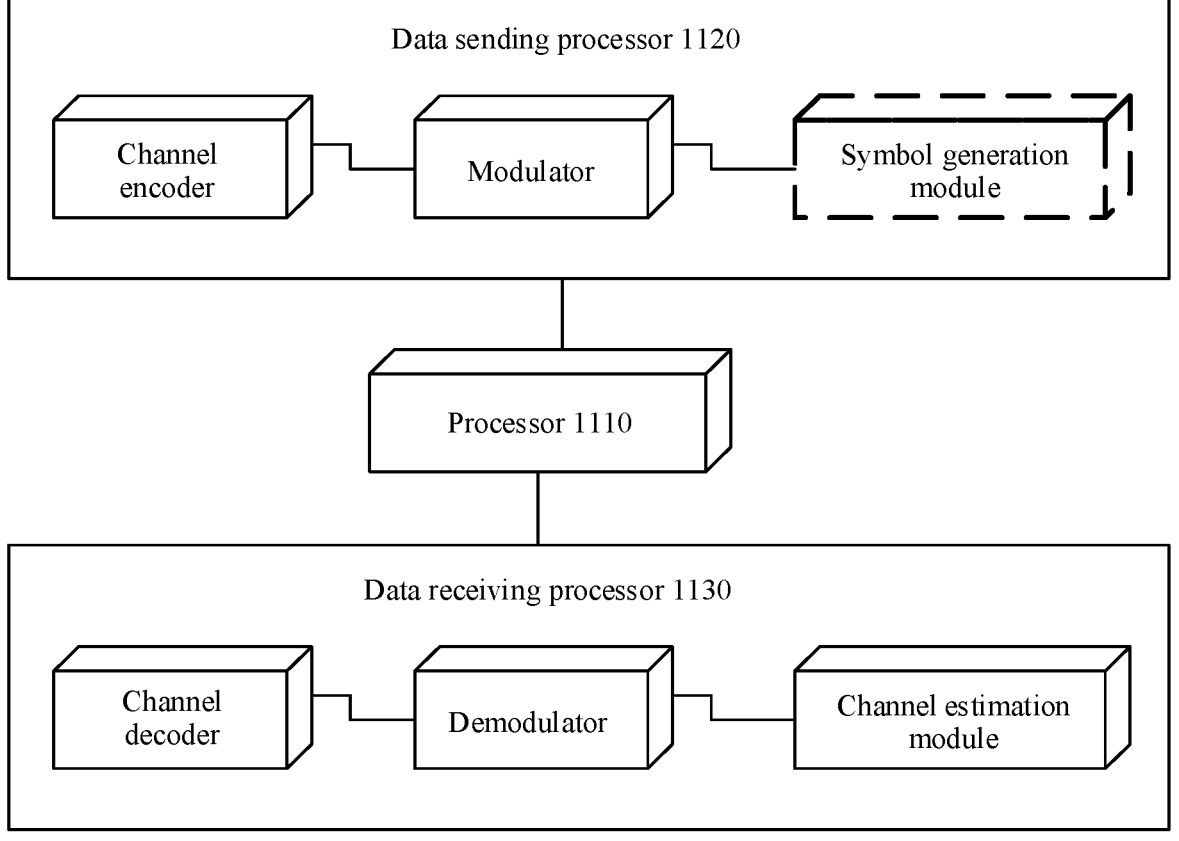
FIG. 11 is another schematic block diagram of a communication apparatus according to an embodiment of this application.

When the communication apparatus in this embodiment is a terminal device, refer to a device shown in FIG. 11. In an example, the device may implement a function similar to that of the processing module 810 in FIG. 8. In FIG. 11, the device includes a processor 1110, a data sending processor 1120, and a data receiving processor 1130. The processing module 810 in the foregoing embodiment may be the processor 1110 in FIG. 11, and completes a corresponding function. The transceiver module 820 in the foregoing embodiment may be the data sending processor 1120 and the data receiving processor 1130 in FIG. 11, and completes a corresponding function. Although FIG. 11 shows a channel encoder and a channel decoder, it may be understood that the modules are merely examples, and do not constitute a limitation on this embodiment.

Figure 12:
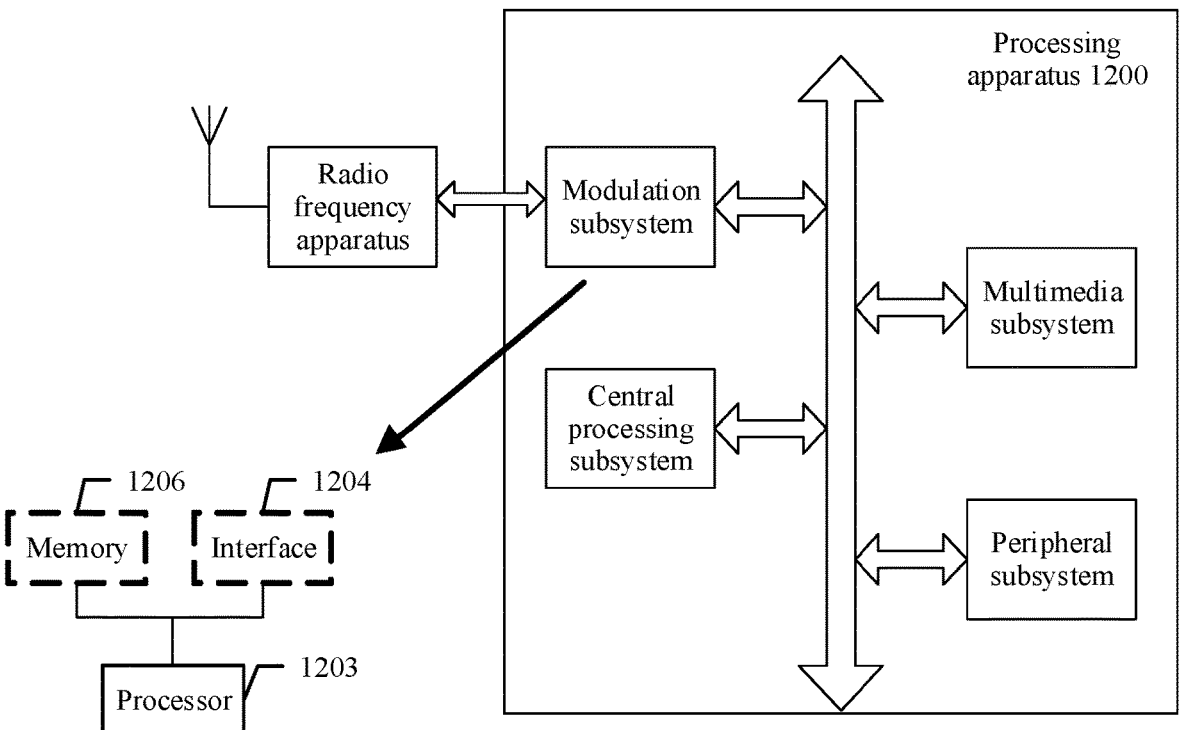
FIG. 12 is still another schematic block diagram of a communication apparatus according to an embodiment of this application.

FIG. 12 shows another form of this embodiment. A processing apparatus 1200 includes modules such as a modulation subsystem, a central processing subsystem, and a peripheral subsystem. The communication apparatus in this embodiment may be used as the modulation subsystem. Specifically, the modulation subsystem may include a processor 1203 and an interface 1204. The processor 1203 implements a function of the processing module 810, and the interface 1204 implements a function of the transceiver module 820. In another variant, the modulation subsystem includes a memory 1206, a processor 1203, and a program that is stored in the memory 1206 and that can be run on the processor. When executing the program, the processor 1203 implements the method on the terminal device side in the foregoing method embodiments. It should be noted that the memory 1206 may be nonvolatile or volatile. The memory 1206 may be located in the modulation subsystem, or may be located in the processing apparatus 1200, provided that the memory 1206 can be connected to the processor 1203.

When the apparatus in this embodiment of this application is a network device, the apparatus may be shown in FIG. 13. The apparatus 1300 includes one or more radio frequency units such as a remote radio unit (RRU) 1310 and one or more baseband units (BBUs) (which may also be referred to as digital units (DUs)) 1320. The RRU 1310 may be referred to as a transceiver module. The transceiver module may include a sending module and a receiving module, or the transceiver module may be one module that can implement sending and receiving functions. The transceiver module may correspond to the transceiver module 920 in FIG. 9. Optionally, the transceiver module may also be referred to as a transceiver machine, a transceiver circuit, a transceiver, or the like, and may include at least one antenna 1311 and a radio frequency unit 1312. The RRU 1310 is mainly configured to: send and receive a radio frequency signal, and perform conversion between the radio frequency signal and a baseband signal. For example, the RRU 1310 is configured to send indication information to a terminal device. The BBU 1310 is mainly configured to: perform baseband processing, control a base station, and the like. The RRU 1310 and the BBU 1320 may be physically disposed together, or may be physically disposed separately, that is, in a distributed base station.

The BBU 1320 is a control center of the base station, and may also be referred to as a processing module. The BBU 1320 may correspond to the processing module 910 in FIG. 9, and is mainly configured to implement a baseband processing function such as channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 1320 may include one or more boards. A plurality of boards may jointly support a radio access network (for example, an LTE network) of a single access standard, or may separately support radio access networks (for example, an LTE network, a 5G network, or another network) of different access standards. The BBU 1320 further includes a memory 1321 and a processor 1322. The memory 1321 is configured to store necessary instructions and data. The processor 1322 is configured to control the base station to perform a necessary action, for example, is configured to control the base station to perform an operation procedure related to the network device in the foregoing method embodiments. The memory 1321 and the processor 1322 may serve the one or more boards. In other words, a memory and a processor may be disposed on each board. Alternatively, a plurality of boards may share a same memory and a same processor. In addition, a necessary circuit may be further disposed on each board.

An embodiment of this application provides a first communication system. The first communication system may include the terminal device in the embodiment shown in FIG. 4 and FIG. 5 and the access network device in the embodiment shown in FIG. 4 and FIG. 5. The terminal device is, for example, the terminal device 800 in FIG. 8, and the access network device is, for example, the network device 900 in FIG. 9.

An embodiment of this application provides a second communication system. The second communication system may include the terminal device in the embodiment shown in FIG. 6 and FIG. 7 and the access network device in the embodiment shown in FIG. 6 and FIG. 7. The terminal device is, for example, the terminal device 800 in FIG. 8, and the access network device is, for example, the network device 900 in FIG. 9.

An embodiment of this application provides a third communication system. The third communication system may include the terminal device in the embodiment shown in FIG. 14A and FIG. 14B and the access network device in the embodiment shown in FIG. 14A and FIG. 14B. The terminal device is, for example, the terminal device 800 in FIG. 8, and the access network device is, for example, the network device 900 in FIG. 9.

An embodiment of this application further provides a computer-readable storage medium. The computer-readable storage medium stores a computer program. When the computer program is executed by a computer, the computer may implement a procedure related to the access network in the embodiment shown in FIG. 4 and FIG. 5 in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 4 and FIG. 5 in the foregoing method embodiments.

An embodiment of this application further provides a computer-readable storage medium. The computer-readable storage medium stores a computer program. When the computer program is executed by a computer, the computer may implement a procedure related to the access network device in the embodiment shown in FIG. 6 and FIG. 7 in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 6 and FIG. 7 in the foregoing method embodiments.

An embodiment of this application further provides a computer-readable storage medium. The computer-readable storage medium stores a computer program. When the computer program is executed by a computer, the computer may implement a procedure related to the access network device in the embodiment shown in FIG. 14A and FIG. 14B in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 14A and FIG. 14B in the foregoing method embodiments.

An embodiment of this application further provides a computer program product. The computer program product is configured to store a computer program. When the computer program is executed by a computer, the computer may implement a procedure related to the access network device in the embodiment shown in FIG. 4 and FIG. 5 in the foregoing method embodiments.

An embodiment of this application further provides a computer program product. The computer program product is configured to store a computer program. When the computer program is executed by a computer, the computer may implement a procedure related to the terminal device in the embodiment shown in FIG. 4 and FIG. 5 in the foregoing method embodiments.

An embodiment of this application further provides a computer program product. The computer program product is configured to store a computer program. When the computer program is executed by a computer, the computer may implement a procedure related to the access network device in the embodiment shown in FIG. 6 and FIG. 7 in the foregoing method embodiments.

An embodiment of this application further provides a computer program product. The computer program product is configured to store a computer program. When the computer program is executed by a computer, the computer may implement a procedure related to the terminal device in the embodiment shown in FIG. 6 and FIG. 7 in the foregoing method embodiments.

An embodiment of this application further provides a computer program product. The computer program product is configured to store a computer program. When the computer program is executed by a computer, the computer may implement a procedure related to the access network device in the embodiment shown in FIG. 14A and FIG. 14B in the foregoing method embodiments.

An embodiment of this application further provides a computer program product. The computer program product is configured to store a computer program. When the computer program is executed by a computer, the computer may implement a procedure related to the terminal device in the embodiment shown in FIG. 14A and FIG. 14B in the foregoing method embodiments.

It should be understood that the processor mentioned in embodiments of this application may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing computer-readable storage medium may be any available medium that can be accessed by a computer. By way of example, and not limitation, the computer-readable medium may include a random access memory (RAM), a read-only memory (ROM), an electrically erasable programmable read-only memory (EE-PROM), a compact disc read-only memory (CD-ROM), a universal serial bus flash disk (universal serial bus flash disk), a removable hard disk or another compact disc storage, a magnetic disk storage medium or another magnetic storage device, or any other medium that can be used to carry or store expected program code in a form of instructions or a data structure and that can be accessed by a computer.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, comprising:
camping, by a terminal device, on a first cell;
determining, by the terminal device, to access a second cell in response to receiving a paging message from the first cell, in response to determining that there is to-be-transmitted uplink information, or in response to determining that there is a to-be-transmitted non-multicast service, wherein a frequency of the first cell is a first frequency and a frequency of the second cell is a second frequency; and wherein the first cell and the second cell meet the following: the first frequency is lower than the second frequency; and a quantity of beams of the first cell is less than a quantity of beams of the second cell;

changing a serving cell to the first cell through cell selection, cell reselection, or handover, wherein the serving cell of the terminal device is a third cell and a frequency of the third cell is different from the first frequency, including:
receiving a first message from a network device, wherein the first message indicates that the first frequency is a frequency in an energy-saving mode;
determining, based on at least one of an energy-saving mode of the terminal device, a service activity degree of the terminal device, power of the terminal device, and an access delay of the terminal device to change the serving cell to the first cell; and
measuring the first frequency and changing the serving cell to the first cell.

2. The method according to claim 1, wherein the first cell and the second cell further meet the following:
coverage of the first cell is greater than coverage of the second cell.

3. The method according to claim 1, wherein the first cell does not support uplink transmission or the first cell supports only multicast service transmission.

4. The method according to claim 1, wherein the determining to access the second cell comprises at least one of:
determining to access the second cell in response to determining that there is to-be-transmitted uplink information and determining that the first cell does not support uplink transmission;
determining to access the second cell in response to determining that there is to-be-transmitted uplink information and determining that the to-be-transmitted uplink information is a data service; or
determining to access the second cell in response to determining that there is a to-be-transmitted non-multicast service and determining that the first cell supports only multicast service transmission.

5. The method according to claim 1, wherein the determining to access the second cell further comprises:
measuring a reference signal of the first cell, and determining to access the second cell in response to a measurement result being less than a first threshold.

6. The method according to claim 1, further comprising:
receiving indication information from the network device, wherein the indication information indicates to access the second cell, indicates not to access the first cell, indicates to select a cell based on the second frequency for access, or indicates that a frequency priority of the first frequency is the lowest priority.

7. The method according to claim 1, wherein the determining to access the second cell further comprises:
performing cell selection based on the second frequency and choosing to access the second cell; or
lowering a frequency priority of the first frequency to a frequency priority lower than that of the second frequency, triggering a measurement on a cell whose frequency is the second frequency, and reselecting the second cell.

8. The method according to claim 1,
wherein the first message indicates a frequency priority of the first frequency.

9. A communication method, comprising:
determining, by a first access network device, indication information, wherein the indication information indicates to access a second cell, indicates not to access a first cell, indicates to select a cell based on a second frequency for access, or indicates that a frequency priority of a first frequency is the lowest priority;

sending, by the first access network device, the indication information to a terminal device through the first cell, wherein a frequency of the first cell is the first frequency, a frequency of the second cell is the second frequency, the first cell is a cell of the first access network device, and the second cell is a cell of a second access network device; and wherein the first cell and the second cell meet the following: the first frequency is lower than the second frequency; and a quantity of beams of the first cell is less than a quantity of beams of the second cell;

sending a first message to the terminal device, wherein the first message indicates that the first frequency is a frequency in an energy-saving mode, which enables the terminal device to determine, based on at least one of an energy-saving mode of the terminal device, a service activity degree of the terminal device, power of the terminal device, and an access delay of the terminal device to change a serving cell to the first cell, measures the first frequency and changes the serving cell to the first cell through cell selection, cell reselection, or handover, wherein the serving cell of the terminal device is a third cell and a frequency of the third cell is different from the first frequency.

10. The method according to claim 9, wherein the first cell and the second cell further meet the following:

coverage of the first cell is greater than coverage of the second cell.

11. The method according to claim 9, wherein the first cell does not support uplink transmission or the first cell supports only multicast service transmission.

12. The method according to claim 9, wherein the indication information is carried in a paging message.

13. The method according to claim 9, wherein the first message indicates the frequency priority of the first frequency.

14. An apparatus, comprising:

a memory storing instructions; and at least one processor in communication with the memory, the at least one processor configured, upon execution of the instructions, to implement:

camping on a first cell;

determining to access a second cell in response to receiving a paging message from the first cell, in response to determining that there is to-be-transmitted uplink information, or in response to determining that there is a to-be-transmitted non-multicast service, wherein a frequency of the first cell is a first frequency, and a frequency of the second cell is a second frequency; and wherein the first cell and the second cell meet the following: the first frequency is lower than the second frequency; and a quantity of beams of the first cell is less than a quantity of beams of the second cell;

changing a serving cell to the first cell through cell selection, cell reselection, or handover, wherein the serving cell of a terminal device is a third cell and a frequency of the third cell is different from the first frequency, including:

receiving a first message from a network device, wherein the first message indicates that the first frequency is a frequency in an energy-saving mode;

determining, based on at least one of an energy-saving mode of the terminal device, a service activity degree of the terminal device, power of the terminal device, and an access delay of the terminal device to change the serving cell to the first cell; and measuring the first frequency and changing the serving cell to the first cell.

15. The apparatus according to claim 14, wherein the first cell and the second cell further meet the following:

coverage of the first cell is greater than coverage of the second cell.

16. The apparatus according to claim 14, wherein the first cell does not support uplink transmission or the first cell supports only multicast service transmission.

17. The apparatus according to claim 14, wherein the determining to access the second cell in response to receiving the paging message from the first cell, in response to determining that there is to-be-transmitted uplink information, or in response to determining that there is a to-be-transmitted non-multicast service comprises at least one of:

determining to access the second cell in response to determining that there is to-be-transmitted uplink information and determining that the first cell does not support uplink transmission;

determining to access the second cell in response to determining that there is to-be-transmitted uplink information and determining that the to-be-transmitted uplink information is a data service; or determining to access the second cell in response to determining that there is a to-be-transmitted non-multicast service and determining that the first cell supports only multicast service transmission.

18. The apparatus according to claim 14, wherein the determining to access the second cell further comprises:

measuring a reference signal of the first cell and determining to access the second cell in response to a measurement result being less than a first threshold.

19. The apparatus according to claim 14, wherein the at least one processor is further configured to implement:

receiving indication information from the network device, wherein the indication information indicates to access the second cell, indicates not to access the first cell, indicates to select a cell based on the second frequency for access, or indicates that a frequency priority of the first frequency is the lowest priority.

20. The apparatus according to claim 14, wherein the determining to access the second cell further comprises:

performing cell selection based on the second frequency and choosing to access the second cell; or lowering a frequency priority of the first frequency to a frequency priority lower than that of the second frequency, triggering a measurement on a cell whose frequency is the second frequency, and reselecting the second cell.

* * * * *